United States Patent
Homma et al.

(10) Patent No.: US 10,169,880 B2
(45) Date of Patent: Jan. 1, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Shunichi Homma, Tokyo (JP); Akihiko Kaino, Kanagawa (JP); Tatsuki Kashitani, Tokyo (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 15/324,067

(22) PCT Filed: Jun. 1, 2015

(86) PCT No.: PCT/JP2015/002755
§ 371 (c)(1),
(2) Date: Jan. 5, 2017

(87) PCT Pub. No.: WO2016/031105
PCT Pub. Date: Mar. 3, 2016

(65) Prior Publication Data
US 2017/0206666 A1    Jul. 20, 2017

(30) Foreign Application Priority Data
Aug. 26, 2014  (JP) .................................. 2014-171795

(51) Int. Cl.
*G06K 9/00*   (2006.01)
*G06T 7/246*  (2017.01)
(Continued)

(52) U.S. Cl.
CPC ............ *G06T 7/246* (2017.01); *G01B 11/002* (2013.01); *G01S 17/66* (2013.01); *G06F 3/017* (2013.01); *G06K 9/00342* (2013.01); *G06K 9/46* (2013.01)

(58) Field of Classification Search
None
See application file for complete search history.

(56) References Cited

U.S. PATENT DOCUMENTS 5,164,670 A * 11/1992 Szalma .............. G01R 33/4625
                                                       324/309
6,072,903 A *  6/2000 Maki ........................ G06T 7/246
                                                       348/169
(Continued)

FOREIGN PATENT DOCUMENTS

JP    2002-007030    1/2002
JP    2004-157850    6/2004
(Continued)

*Primary Examiner* — Shervin Nakhjavan
(74) *Attorney, Agent, or Firm* — Paratus Law Group, PLLC

(57) ABSTRACT

There is provided an information processing apparatus that self position estimation with high robustness is possible, the information processing apparatus including: a tracking unit, a region estimation unit, and an estimation processing unit. The tracking unit that acquires an image captured by an image capture unit disposed at a moving object, and corresponds characteristic points included in the image captured before movement and the image captured after the movement, the moving object moving accompanying a rotation motion. The region estimation unit that acquires information about the movement, and estimates regions where two-dimensional positions of the characteristic points are less changed viewed from the moving object before and after the movement of the moving object on the basis of the information. The estimation processing unit that performs self position estimation of the moving object using the characteristic points within the regions corresponded by the tracking unit.

20 Claims, 13 Drawing Sheets

(51) Int. Cl.
*G01B 11/00* (2006.01)
*G01S 17/66* (2006.01)
*G06F 3/01* (2006.01)
*G06K 9/46* (2006.01)

(56) References Cited

U.S. PATENT DOCUMENTS

| | | | | |
|---|---|---|---|---|
| 8,259,998 | B2* | 9/2012 | Okugi | G06K 9/00791 382/103 |
| 9,256,987 | B2* | 2/2016 | Ackerman | G06T 19/006 |
| 2008/0297474 | A1* | 12/2008 | Blomqvist | G06F 1/1626 345/158 |
| 2011/0096093 | A1* | 4/2011 | Oi | G06T 19/006 345/633 |
| 2012/0129605 | A1* | 5/2012 | Livet | G06K 9/00355 463/39 |
| 2012/0194644 | A1* | 8/2012 | Newcombe | G06T 7/20 348/46 |
| 2013/0120224 | A1* | 5/2013 | Cajigas | G09G 5/00 345/8 |
| 2014/0005544 | A1* | 1/2014 | Zalev | A61B 5/0095 600/440 |
| 2014/0232652 | A1* | 8/2014 | Weising | G09G 5/08 345/158 |
| 2014/0375680 | A1* | 12/2014 | Ackerman | G06T 19/006 345/633 |
| 2015/0235432 | A1* | 8/2015 | Bronder | G06T 19/006 345/633 |
| 2016/0092725 | A1* | 3/2016 | Albertson | G08B 13/19613 348/47 |
| 2017/0231702 | A1* | 8/2017 | Crawford | A61B 34/32 700/254 |

FOREIGN PATENT DOCUMENTS

| | | |
|---|---|---|
| JP | 2009-031295 | 2/2009 |
| JP | 2010-145219 | 7/2010 |
| JP | 2010-288112 | 12/2010 |
| JP | 2012-248032 | 12/2012 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2015/002755 (filed on Jun. 1, 2015) under 35 U.S.C. § 371, which claims priority to Japanese Patent Application No. 2014-171795 (filed on Aug. 26, 2014), which are all hereby incorporated by reference in their entirety.

TECHNICAL FIELD

The present technology relates to an information processing apparatus, an information processing method, and a program that performs self position estimation of a moving object.

BACKGROUND ART

In recent years, a head mount display is increasingly expected to be applied to a number of fields of, for example, manufacturing, a medical care, a game, or a daily life. As the technology utilizing the head mount display, AR (Augmented Reality) technology that displays virtual information superimposed with a real world, and a VR (Virtual Reality) technology that changes display information by matching with a user's motion are known, for example.

In the above-described AR technology and the VR technology, a self position estimation technology that estimates a position or a posture of a user is used. As the self position estimation technology, SLAM (Simultaneous Localization and Mapping) is known, for example. The SLAM is a technology that the self position estimation and an environmental map creation are performed at the same time. Patent Literatures 1 to 3 disclose the technology that the self position estimation is performed by the SLAM. By the SLAM, characteristic points are tracked using images captured from a moving object in time series, for example, thereby estimating a self position of the moving object.

CITATION LIST

Patent Literature

Patent Literature 1: Japanese Patent Application Laid-open No. 2010-288112
Patent Literature 2: Japanese Patent Application Laid-open No. 2010-145219
Patent Literature 3: Japanese Patent Application Laid-open No. 2012-248032

DISCLOSURE OF INVENTION

Technical Problem

In the above-described self position estimation, when the user moves unpredictably such that a direction of a camera is changed rapidly, for example, turns around or shakes, tracking of the characteristic points is difficult. In this case, accuracy of the self position estimation is lowered. Accordingly, when the direction of the camera is changed rapidly, there is a need to provide a self position estimation technology having high robustness that the characteristic points are tracked well.

In view of the above-described circumstances, an object of the present technology is to provide an information processing apparatus, an information processing method, and a program that self position estimation with high robustness is possible.

Solution to Problem

In order to achieve the object, an information processing apparatus according to an embodiment of the present technology includes a tracking unit, a region estimation unit, and an estimation processing unit.

The tracking unit that acquires an image captured by an image capture unit disposed at a moving object, and corresponds characteristic points included in the image captured before movement and the image captured after the movement, the moving object moving accompanying a rotation motion.

The region estimation unit that acquires information about the movement, and estimates regions where two-dimensional positions of the characteristic points are less changed viewed from the moving object before and after the movement of the moving object on the basis of the information.

The estimation processing unit that performs self position estimation of the moving object using the characteristic points within the regions corresponded by the tracking unit.

By this configuration, the region estimation unit estimates the region where the two-dimensional positions of the characteristic points are less changed viewed from the moving object before and after the movement of the moving object. When the direction of the image capture unit is changed rapidly, there is a possibility that the positions of the characteristic points do not rapidly moved within the region estimated by the region estimation unit. The region estimation unit can perform the self position estimation technology having high robustness by using the characteristic points within the region estimated by the region estimation unit.

The region estimation unit may calculate a rotation axis of the rotation motion, and estimate the regions using the rotation axis.

By this configuration, the region estimation unit estimates that the closer the regions to a rotation axis of the rotation motion of the moving object are, the less the two-dimensional positions of the characteristic points viewed from the moving object before and after the movement of the moving object are changed. The region estimation unit can estimate the regions with high precision by using the rotation axis.

The image capture unit may include a plurality of camera mechanisms having optical axes that are mutually not in parallel.

The region estimation unit may select the camera mechanism having the optical axis where the angle between the rotation axis and the optical axis is smallest among the plurality of camera mechanisms.

The estimation processing unit may perform the self position estimation of the moving object using the characteristic points included in the image captured by the camera mechanism selected by the region estimation unit.

By this configuration, the region captured by the camera mechanism having the optical axis where the angle between the rotation axis and the optical axis is small among the plurality of camera mechanisms is estimated as the regions where the two-dimensional positions of the characteristic points are less changed viewed from the moving object before and after the movement of the moving object. The region estimation unit can perform the self position estimation technology having high robustness by using the characteristic points included in the image captured by the camera mechanism selected by the region estimation unit.

The information processing apparatus may further include a data generation unit that extracts the characteristic points included in the image captured by the camera mechanism selected by the region estimation unit from the characteristic points corresponded by the tracking unit.

The estimation processing unit may perform the self position estimation of the moving object using the characteristic points extracted by the data generation unit.

By this configuration, the data generation unit extracts the characteristic points included in the image captured by the camera mechanism selected by the region estimation unit from the characteristic points corresponded by the tracking unit. The estimation processing unit can perform the self position estimation having high robustness by using the characteristic points extracted by the data generation unit.

The tracking unit may correspond the characteristic points included in the image captured by the camera mechanism selected by the region estimation unit.

By this configuration, the tracking unit corresponds the characteristic points included in the image captured by the camera mechanism selected by the region estimation unit. The estimation processing unit can perform the self position estimation having high robustness by using the characteristic points corresponded by the tracking unit.

The region estimation unit may estimate the regions such that the rotation axis passes through the regions.

By this configuration, the regions through which the rotation axis of the rotation motion of the moving object passes are estimated that the two-dimensional positions of the characteristic points are less changed viewed from the moving object before and after the movement of the moving object. This allows accuracy of region estimation by the region estimation unit to be improved.

The image capture unit may have a viewing angle of 90° or more.

By this configuration, by using a wide view angle camera (a wide angle camera, a fish-eye camera, a panorama camera, etc.), the regions through which the rotation axis of the moving object passes are easily included in the images captured by the image capture unit.

The information processing apparatus may further includes a data generation unit that limits a processing region of the image within the regions.

The estimation processing unit may perform the self position estimation of the moving object using the characteristic points included in the processing region.

By this configuration, the data generation unit limits the processing region of the images captured by the image capture unit to the regions estimated such that the two-dimensional positions of the characteristic points are less changed viewed from the moving object before and after the movement of the moving object. The estimation processing unit performs the self position estimation using the characteristic points included in the processing region. In this manner, the estimation processing unit can perform effectively the self position estimation than using the characteristic points included in whole images captured by the image capture unit.

The data generation unit may extract the characteristic points included in the processing region from the characteristic points corresponded by the tracking unit.

The estimation processing unit may perform the self position estimation of the moving object using the characteristic points extracted by the data generation unit.

By this configuration, the data generation unit extracts the characteristic points included in the processing region from the characteristic points corresponded by the tracking unit. The estimation processing unit can perform effectively the self position estimation by using the characteristic points extracted by the data generation unit.

The tracking unit may correspond the characteristic points included in the processing region.

By this configuration, the tracking unit can perform effectively the self position estimation by using the characteristic points corresponded by the tracking unit.

The region estimation unit may enlarge the processing region, when the angular velocity of the rotation motion is great.

The region estimation unit may enlarge the processing region, when the movement accompanies a translation motion.

By this configuration, when it is expected that the characteristic points viewed from the moving object are relatively greatly changed before and after the movement of the moving object M, the processing region is enlarged. The characteristic points where the two-dimensional positions are less changed viewed from the moving object before and after the movement of the moving object can be prevented from deviating from the processing region. This allows a sufficient number of the characteristic points for the self position estimation to be ensured.

The tracking unit may set tracking scores that show a degree of coincidence for the characteristic points in the image captured before the movement and the image captured after the movement for the every corresponded characteristic points.

The estimation processing unit may perform the self position estimation of the moving object using the characteristic points having the high tracking scores.

By the configuration, the tracking unit sets the tracking scores that show a degree of coincidence for the respective characteristic points in the image captured before the movement and the image captured after the movement for corresponded respective characteristic points. In other words, the higher the degree of coincidence for the respective characteristic points is, the higher the tracking scores are. The lower the degree of coincidence for the respective characteristic points is, the lower the tracking scores are. The estimation processing unit can perform the self position estimation with high accuracy by using the characteristic points having high tracking scores.

The tracking unit may set high the tracking scores of the characteristic points within a central region of at least one of the image captured before the movement and the image captured after the movement.

By this configuration, among the image captured before and after the movement of the moving object, there is a high possibility that the characteristic points within a central region of one image are included in the other image. It is estimated that the degree of coincidence in the image captured before and after the moving object is moved is high. Accordingly, the tracking scores of the characteristic points within the central region of at least one of the image captured before and after the movement of the moving object are made high. The estimation processing unit can perform the self position estimation with high accuracy by using the characteristic points having the high tracking scores.

The information may be generated using at least one of a gyro sensor, a geomagnetic sensor, an acceleration sensor, a sound source direction estimation device and Wi-Fi.

By this configuration, there are provided specific means for acquiring the information about the movement of the moving object.

The information processing apparatus may further include a monitoring unit that monitors the moving object by the information.

The estimation processing unit may perform self position estimation of the moving object independent of the self position estimation on the basis of the result of the monitoring by the monitoring unit.

By this configuration, the self position estimation is performed using the result of monitoring by the monitoring unit independent of the self position estimation using the characteristic points included in the image captured by the image capture unit. Thus, the self position estimation is performed in two ways, thereby improving the accuracy of the self position estimation. Furthermore, when the self position estimation is difficult by one of the two ways, the self position estimation is possible by the other of the two ways. Therefore, the result of the self position estimation can be acquired with more certainty.

The monitoring unit may estimate a motion model of the moving object.

The estimation processing unit may perform the self position estimation of the moving object using the motion model estimated by the monitoring unit.

By this configuration, the self position estimation can be effectively done by the estimation processing unit by using the motion model estimated by the monitoring unit.

The information processing apparatus may further included a head mount display having the image capture unit and a detection unit being capable of generating the information, the head mount display being configured to be mountable to a head of a user as the moving object.

By this configuration, there can be provided a head mount display apparatus that can perform the self position estimation having high robustness.

In an information processing method according to an embodiment of the present technology, an image is captured by an image capture unit disposed at a moving object that moves accompanying a rotation motion.

Characteristic points included in the image captured before movement and the image captured after the movement are corresponded.

Information about the movement is generated.

Regions where the two-dimensional positions of the characteristic points are less changed viewed from the moving object before and after the movement of the moving object on the basis of the information are estimated.

A self position estimation of the moving object using the corresponded characteristic points within the regions is performed.

A program according to an embodiment of the present technology makes an information processing apparatus execute the steps of acquiring an image captured by an image capture unit disposed at a moving object, and corresponding characteristic points included in the image captured before movement and the image captured after the movement, the moving object moving accompanying a rotation motion.

The program makes an information processing apparatus execute the steps of acquiring information about the movement, and estimating regions where two-dimensional positions of the characteristic points are less changed viewed from the moving object before and after the movement of the moving object on the basis of the information.

The program makes an information processing apparatus execute the steps of performing self position estimation of the moving object using the corresponded characteristic points within the regions.

Advantageous Effects of Invention

As described above, according to the present technology, an information processing apparatus, an information processing method, and a program that self position estimation with high robustness can be provided.

MODE(S) FOR CARRYING OUT THE INVENTION

Hereinafter, embodiments of the present technology will be described with reference to the drawings.

The drawings show an X axis, an Y axis, and a Z axis that are mutually orthogonal.

First Embodiment

[Overall Configuration of Information Processing System 100]

Figure 1:
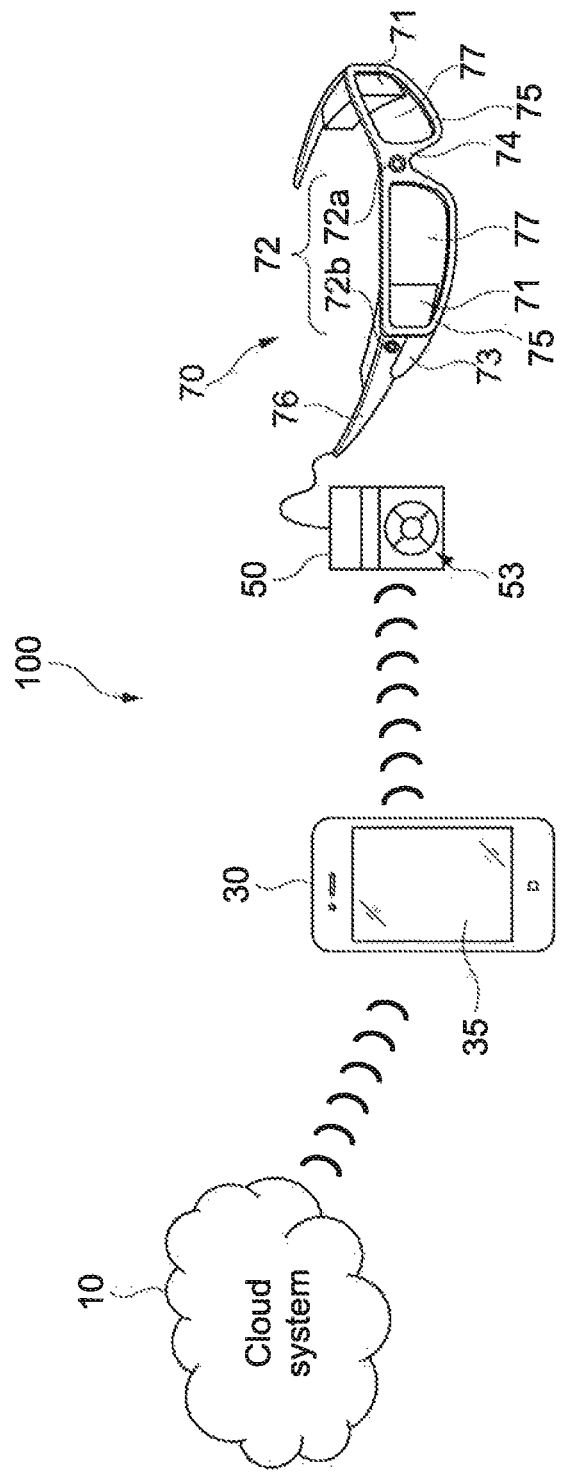
FIG. 1 is a schematic configuration diagram of an information processing system according to a first embodiment of the present technology.

FIG. 1 is a schematic configuration diagram of an information processing system 100 according to a first embodiment of the present technology.

The information processing system 100 includes a portable terminal 30, a head mount display 70, and a control box 50. The information processing system 100 may include a cloud system 10.

The portable terminal 30 is typically configured as a portable information processing apparatus such as a smartphone. The portable terminal 30 may be configured as a tablet device, or other PC (Personal Computer). The portable terminal 30 is communication-connected to the cloud system 10.

The head mount display 70 is configured as a mounting unit that is mountable to a head of a user that is a moving object M. The head mount display 70 includes an image capture unit 72, and the image capture unit 72 captures an image around the user who wears the head mount display 70.

The control box 50 is configured as a control unit to control the head mount display 70. The user wearing the head mount display 70 can operate the head mount display 70 via the control box 50. The control box 50 is communication-connected to the portable terminal 30.

The cloud system 10 is a system on the basis of an electronic communications network, such as the Internet, for example. The cloud system 10 includes a server computer connected to the electronic communications network.

[Configuration of Each Device of Information Processing System 100]

Figure 2:
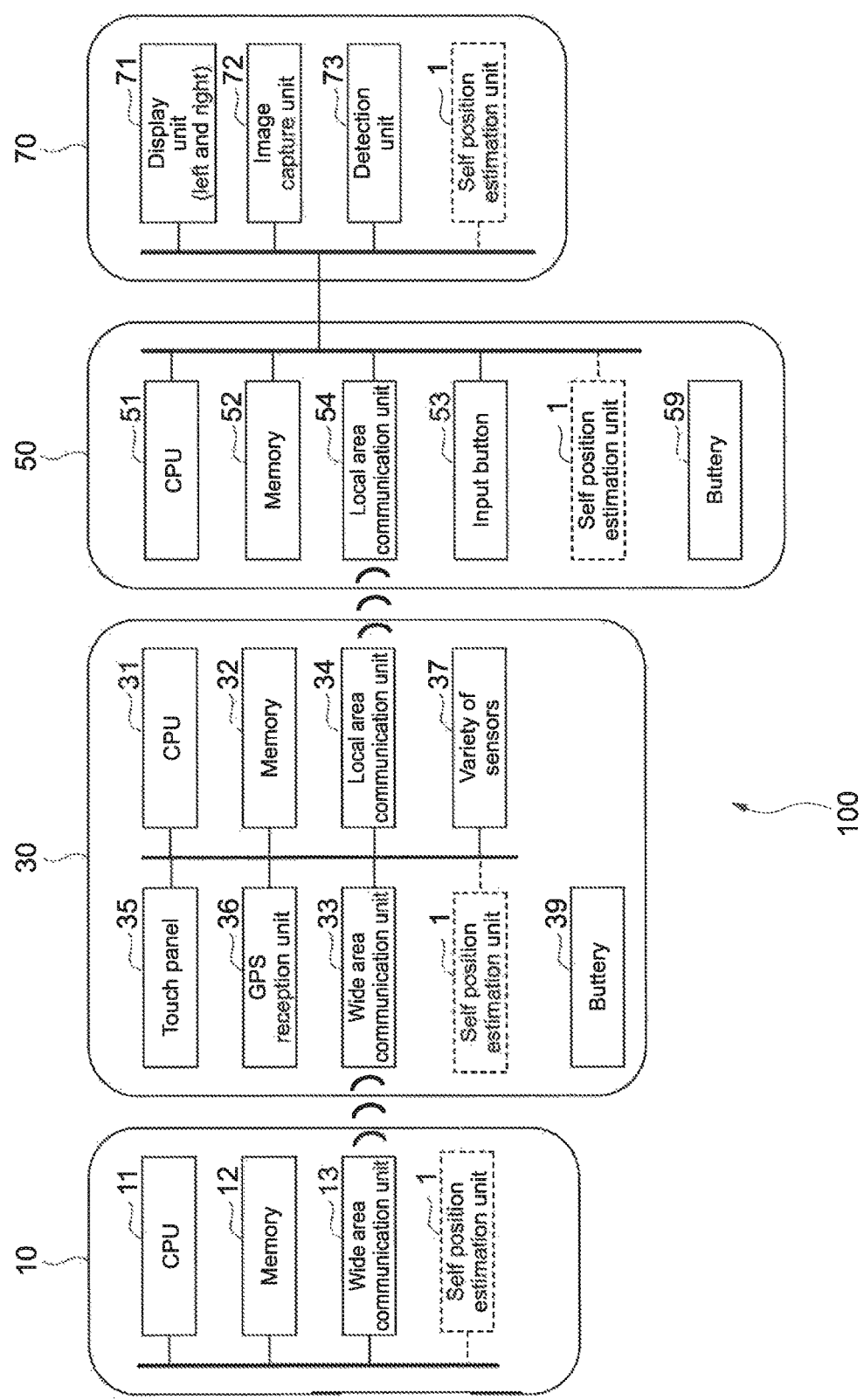
FIG. 2 is a block diagram showing a configuration of each device of the information processing system.

FIG. 2 is a block diagram showing a configuration of the portable terminal 30, the control box 50, the head mount display 70, and the server computer of the cloud system 10 in the information processing system 100.

(Portable Terminal 30)

The portable terminal 30 includes a CPU (Central Processing Unit) 31, a memory 32, a wide area communication unit 33, a local area communication unit 34, a touch panel 35, a GPS (Global Positioning System) reception unit 36, and a buttery 39.

The CPU 31 controls inclusively each unit within the portable terminal 30. The memory 32 stores, for example, an OS (Operating System), programs for a variety of application software, a variety of data, etc. The memory 32 is configured to be accessible by the CPU 31, as appropriate.

The wide area communication unit 33 is configured to be communicable with the cloud system 10 by 3G (Third Generation), LTE (Long Term Evolution) etc., for example.

The local area communication unit 34 is configured to be communicable by a wireless LAN (Local Area Network) wireless communication system such as Wi-Fi, the Bluetooth (registered trademark), a short distance wireless communication system such as infrared rays, etc., for example. The local area communication unit 34 may be configured to be capable of using a plurality of communication systems.

The touch panel 35 is configured to have both a function as a display apparatus for displaying a variety of information and a function as an operation unit where the operation is designated by the user. The GPS reception unit 36 is configured to be capable of receiving positional information form a GPS satellite. The portable terminal 30 may include other variety of sensors 37 such as a motion sensor, a camera and the like.

(Head Mount Display 70)

The head mount display 70 includes display units 71, an image capture unit 72, and a detection unit 73. As shown in FIG. 1, the head mount display 70 includes a glass frame configuration having left and right rims 75, a bridge 74 between the rims 75, and temple units 76 extending from the rims 75 backwards. In this manner, the head mount display 70 is wearable on the head of the user.

The display units 71 are configured as small-sized projectors disposed inside of the left and right temple units 76. The head mount display 70 is configured such that the same image light or the image light having a parallax emitted from the display units 71 is guided by a light guide 77, and is emitted toward eyeballs of the user from a predetermined region of the light guide 77. In this manner, an image is provided to the user.

Note that the configuration of the display units 71 in the head mount display 70 is not limited to the above, and can be determined, as appropriate. For example, the display unit 71 may be disposed at only one side, i.e., either of left or right, of the head mount display 70. Also, the head mount display 70 is not limited to a projector type, and may include the display units 71 that irradiate directly the eyeballs with the image light.

The image capture unit 72 includes a first camera 72a disposed facing front to the bridge 74, and a second camera 72b facing right (outward) to the right temple unit 76, as shown in FIG. 1. The first camera 72a and the second camera 72b are disposed such that an optical axis $C_a$ of the first camera 72a and an optical axis $C_b$ of the second camera 72b are not in parallel. For example, the optical axis $C_a$ of the first camera 72a and the optical axis $C_b$ of the second camera 72b may be orthogonal.

The cameras 72a and 72b are typically configured as an image sensor such as a CMOS (Complementary Metal Oxide Semiconductor) sensor, and a CCD (Charge Coupled Device) sensor.

Note that the image capture unit 72 may be configured as a plurality of camera mechanisms having optical axes that are mutually not in parallel, and it is not limited to the above-described configuration. For example, the image capture unit 72 may include three or more camera mechanisms. Also, the plurality of camera mechanisms may each configure an independent monocular camera. Alternatively, the plurality of camera mechanisms may configure a single stereo camera or a lens array as a whole.

In addition, the cameras of the image capture unit 72 may simply capture an image around the user, and can be disposed at any position of the rims 75, the bridge 74, and temple units 76. For example, the image capture unit 72 may include one camera at each temple unit 76.

Furthermore, the image capture unit 72 may include a camera mountable to the user in addition to the head mount display 70. For example, the image capture unit 72 may include a camera mountable to a top of a user's head upward.

The detection unit 73 is configured to detect information about the movement of the user to which the head mount display 70 is mounted. In detail, the detection unit 73 is configured to at least detect a rotation motion component of the movement of the user. For example, the detection unit 73 is configured to provide information that can separate a rotation motion component and a translation motion component of the movement of the user.

The detection unit 73 is typically configured as a sensor that can detect a direction of the user such as a gyro sensor, a geomagnetic sensor, and an acceleration sensor. Also, the detection unit 73 may be configured to detect the direction of the user by Wi-Fi. Furthermore, the detection unit 73 may be configured as a sound source direction estimation device that detects the direction of the user by sending and receiving an acoustic signal. Note that the detection unit 73 may be provided by combining a plurality of configurations.

(Control Box 50)

The control box 50 include a CPU 51, a memory 52, a local area communication unit 54, an input button 53, and a buttery 59. The control box 50 may be configured as a part of the head mount display 70, or may be configured independently from the head mount display 70.

The CPU 51 controls inclusively each unit within the control unit 50 and each unit within the head mount display 70. The memory 52 stores, for example, an OS, programs for a variety of application software, a variety of data, etc. The memory 52 is configured to be accessible by the CPU 51, as appropriate.

The local area communication unit 54 is configured to be communicable with the local area communication unit 34 of the portable terminal 30 by a common communication system of the local area communication unit 34 of the portable terminal 30.

The input button 53 is disposed at a front of the control box 50, and is configured as an operation unit of the control box 50 and the head mount display 70. The input button 53 includes, for example, a power source button and an ON/OFF button of the display unit 71.

(Cloud System 10)

The server computer of the cloud system 10 includes a CPU 11, a memory 12, and the wide area communication unit 13.

The CPU 11 controls inclusively each unit within the server computer. The memory 12 stores, for example, an OS, programs for a variety of application software, a variety of data, etc. The memory 12 is configured to be accessible by the CPU 11, as appropriate.

A wide area communication unit 13 is configured to be communicable with the wide area communication unit 33 of the portable terminal 30 by a common communication system of the wide area communication unit 33 of the portable terminal 30.

[Configuration of Self Position Estimation Unit 1]

The information processing system 100 according to this embodiment includes a self position estimation unit 1. The self position estimation unit 1 is configured as an information processing apparatus for estimating the position and the posture of the user wearing the head mount display 70. In detail, the self position estimation unit 1 estimates the position and the posture of the user at an arbitrary time (t) from the position and the posture of the user at time (t−1) just before the time (t).

Here, the position of the user estimated by the self position estimation unit 1 can be, for example, by represented by a coordinate in a three-dimensional space. Also, the posture of the user estimated by the self position estimation unit 1 can be, for example, represented by the direction to which the user directs. Furthermore, the self position estimation unit 1 may be configured such that the posture of the user can be specifically estimated. For example, it can be possible to estimate that the posture of the user is a standing posture, a sitting posture or a lying posture.

The self position estimation unit 1 may be disposed at any of the server computer of the cloud system 10, the portable terminal 30, the control box 50, and the head mount display 70, as shown in FIG. 2. When the self position estimation unit 1 is disposed at the head mount display 70, the head mount display 70 includes the configuration that is necessary for controlling the self position estimation unit 1 such as the CPU, the memory storing the programs, etc.

The self position estimation unit 1 is controlled by the programs stored in the CPU of each device and the memory of the each device. Note that each device may include a control unit other than the CPU in order to control the self position estimation unit 1. Examples of the control unit other than the CPU includes a PLD (Programmable Logic Device) such as a PGA (Field Programmable Gate Array).

Figure 3:
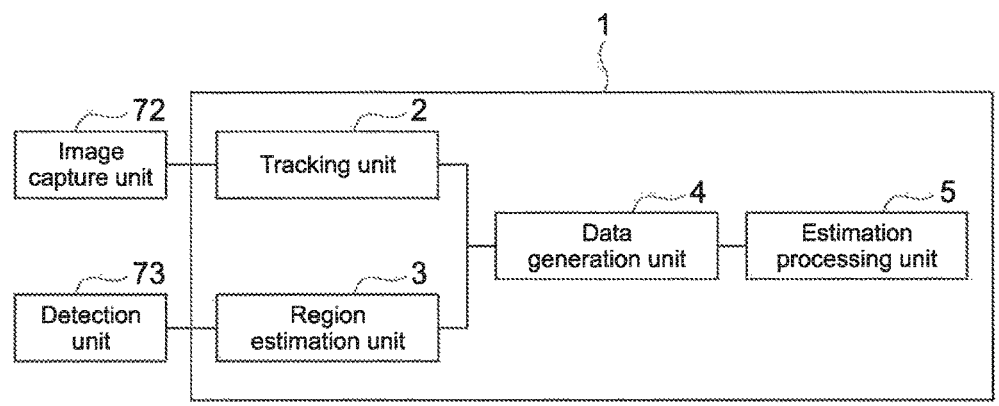
FIG. 3 is a block diagram showing a configuration of a self position estimation unit of the information processing system.

FIG. 3 is a block diagram showing a configuration of the self position estimation unit 1. The self position estimation unit 1 includes a tracking unit 2, a region estimation unit 3, a data generation unit 4, and an estimation processing unit 5.

(Tracking Unit 2)

The tracking unit 2 acquires the image captured by the image capture unit 72 in time series, and tracks the characteristic points using each image. Specifically, the tracking unit 2 corresponds the characteristic points between the image captured at the time (t−1) and the image captured at the time (t). The tracking unit 2 can output a travel amount (dx, dy) of the characteristic points in the two images, for example.

A method of tracking the characteristic points by the tracking unit 2 is not limited to a specific method, and can adopt a general method. For example, the tracking unit 2 may track the characteristic points by utilizing a template matching by a brightness pattern of the image. Also, the tracking unit 2 may track the characteristic points by utilizing matching by characteristic amounts highly described in the image.

Figure 4:
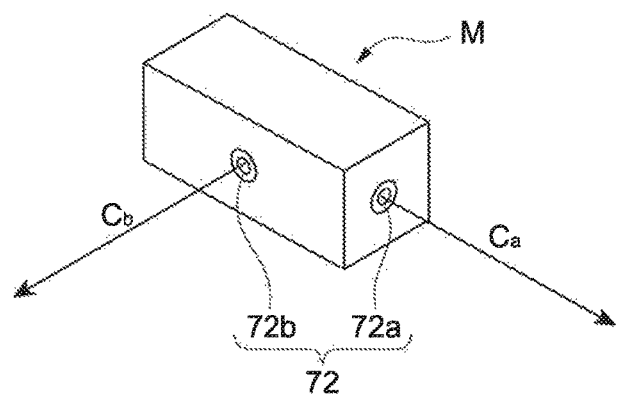
FIG. 4 is a view showing an example of a moving object.

FIG. 4 is a view showing an example of the moving object M for describing an operation of the tracking unit 2. The moving object M shown in FIG. 4 is the user wearing the head mount display 70 shown simplified in FIG. 1. Accordingly, the first camera 72a is disposed at a front of the moving object M, and the second camera 72b is disposed at a right side of the moving object M.

Figure 5:
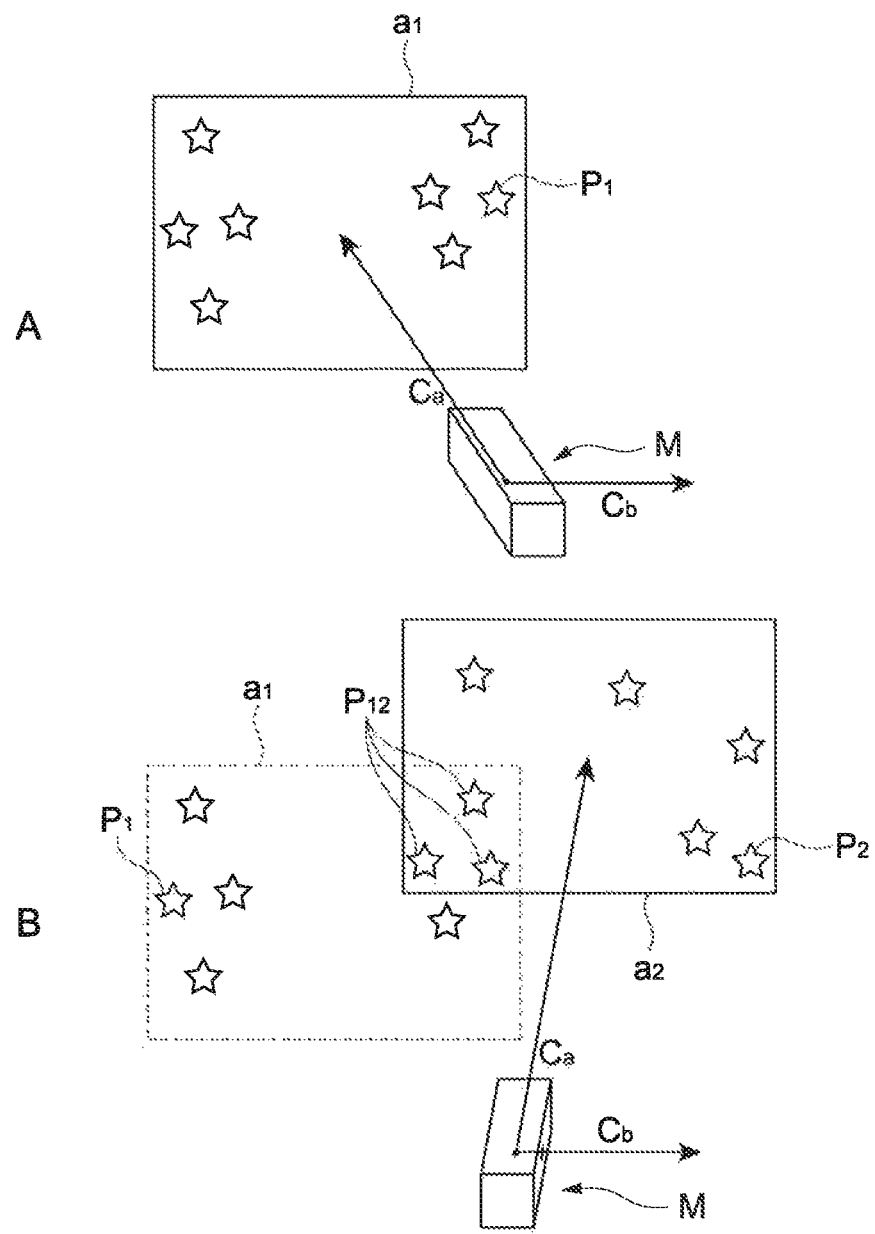
FIG. 5 are views for explaining an operation of a tracking unit of the self position estimation unit.

FIG. 5 are views for explaining an operation of the tracking unit 2. FIG. 5(A) shows a state at a time (t−1), FIG. 5(B) shows a state at a time (t) just after the time. The moving object M moves accompanying a rotation motion between the time (t−1) and the time (t). Therefore, the direction of the moving object M is changed at the time (t−1) shown in FIG. 5(A) and the time (t) shown in FIG. 5(B), and the direction of the optical axis $C_a$ of the first camera 72a and the direction of the optical axis $C_b$ of the second camera 72b are changed.

The first camera 72a captures an image $a_1$ at the time (t−1) shown in FIG. 5(A), and captures an image $a_2$ at the time (t) shown in FIG. 5(B). The tracking unit 2 acquires the image $a_1$ and the image $a_2$ captured by the first camera 72a, detects a characteristic point $P_1$ from the mage $a_1$, and detects a characteristic point $P_2$ from the image $a_2$. Then, the tracking unit 2 corresponds characteristic points $P_{12}$ common to the image $a_1$ and the image $a_2$.

The tracking unit 2 sets a tracking score for every characteristic point $P_{12}$ in common to the image $a_1$ and the image $a_2$. The tracking score converts numerically a degree of coincidence for the every characteristic point $P_{12}$ in the image $a_1$ and the image $a_2$. Specifically, the higher the tracking score of the characteristic point $P_{12}$ is, the better the correspondence in the image $a_1$ and the image $a_2$ is, resulting in high reliability. Oppositely, the lower the tracking score of the characteristic point $P_{12}$ is, the lower the correspondence in the image $a_1$ and the image $a_2$ is, which have lower reliability.

For example, when the characteristic amounts around the characteristic points $P_{12}$ are corresponded well in the image $a_1$ and the image $a_2$, the tracking unit 2 sets the tracking scores of the characteristic points $P_{12}$ high. Oppositely, when the characteristic amounts around the characteristic points $P_{12}$ are corresponded insufficiently in the image $a_1$ and the image $a_2$, the tracking unit 2 sets the tracking scores of the characteristic points $P_{12}$ low.

In addition, there is high possibility that the characteristic points $P_{12}$ within a central region of at least one of the image $a_1$ and the image $a_2$ may be included both in the image at and the image $a_2$ before and after the movement of the moving object M. Accordingly, the tracking unit 2 may set high the tracking scores of the characteristic points $P_{12}$ within the central region of at least one of the image $a_1$ and the image $a_2$.

The tracking unit 2 adds information about a label for specifying the camera that captures the characteristic points $P_{12}$, coordinates of the characteristic points $P_{12}$ in the image at and the image $a_2$, the tracking scores of the characteristic points $P_{12}$, etc. for all characteristic points $P_{12}$, and generates output data. Then, the tracking unit 2 outputs the generated output data to the data generation unit 4.

In the above, the operation of tracking the characteristic points in the tracking unit 2 using the image captured by the first camera 72a is described. However, the tracking unit 2 tracks similarly the characteristic points in the image captured by the second camera 72b.

As described above, for the tracking of the characteristic points by the tracking unit 2 according to this embodiment, a plurality of images captured in different directions from the moving object M are used. Accordingly, when the characteristic points in a certain image of the plurality of the images are difficult to be tracked, the tracking unit 2 can track the characteristic points in other images. Thus, the tracking unit 2 according to this embodiment can acquire the tracking result about the characteristic points with more certainty.

(Region Estimation Unit 3)

The region estimation unit 3 acquires information about the movement of the moving object M generated by the detection unit 73, and estimates the region on the basis of the information. Specifically, the region estimation unit 3 estimates the region where two-dimensional positions of the characteristic points viewed from the moving object M are less changed, i.e., where the directions of the characteristic points viewed from the moving object M are less changed among the regions surrounding the moving object M before and after the movement of the moving object M.

When the region estimated by the region estimation unit 3 is captured by the image capture unit 72, there is high possibility that the characteristic points included in the image captured before the movement of the moving object M are also included in the image captured after the movement of the moving object M. Accordingly, in the image that captures the region estimated by the region estimation unit 3, more characteristic points can be corresponded before and after the movement of the moving object M.

Figure 6:
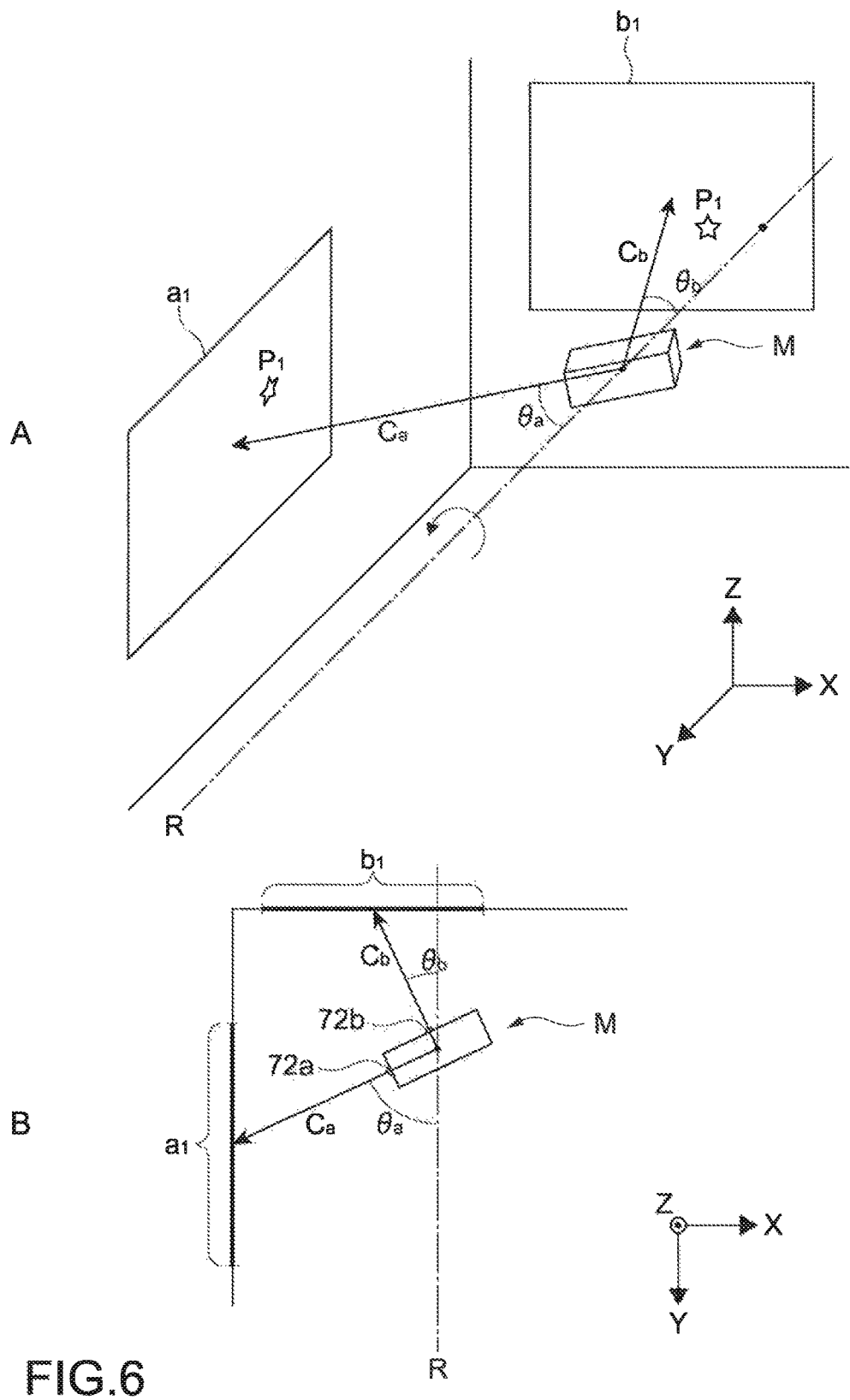
FIG. 6 are views for explaining an operation of a region estimation unit of the self position estimation unit.
Figure 7:
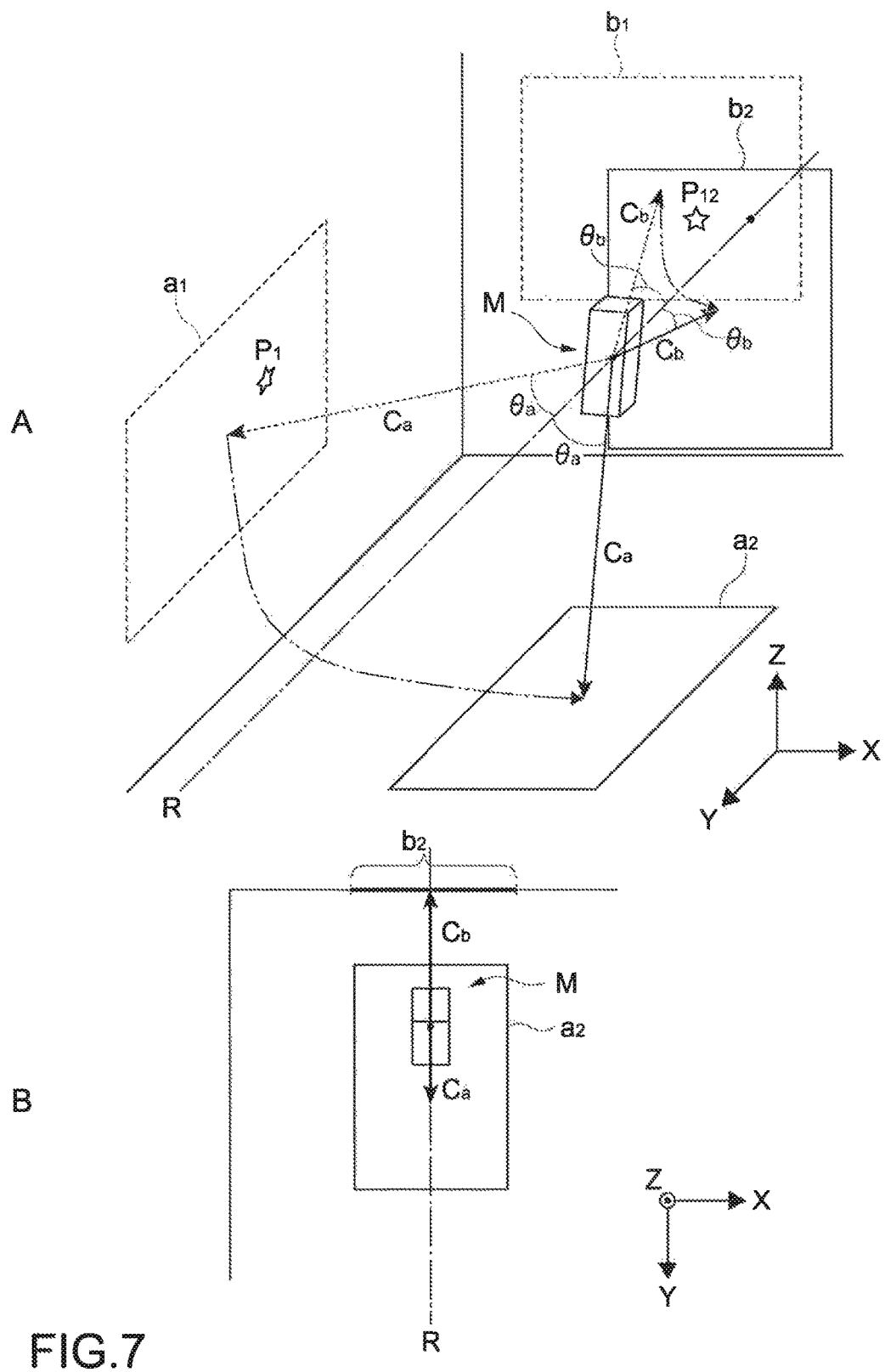
FIG. 7 are views for explaining an operation of a region estimation unit of the self position estimation unit.

FIGS. 6, 7 are views for explaining an operation of the region estimation unit 3. FIG. 6(A) and FIG. 7(A) each is a perspective view, and FIG. 6(B) and FIG. 7(B) each is a plan view.

FIG. 6 shows the state at the time (t−1), and FIG. 7 shows the state at the time (t) just after that. The moving object M moves accompanying the rotation motion between the time (t−1) and the time (t). Accordingly, the direction of the moving object M is changed at the time (t−1) shown in FIG. 6 and at the time (t) shown in FIG. 7, and the directions of the optical axis $C_a$ of the first camera 72a and the optical axis $C_b$ of the second camera 72b are changed.

The first camera 72a captures the image $a_1$ at the time (t−1) shown in FIG. 6, and captures the image $a_2$ at the time (t) shown in FIG. 7. The second camera 72b captures the image $b_1$ at the time (t−1) shown in FIG. 6, and captures the image $b_2$ at the time (t) shown in FIG. 7.

When the movement of the moving object M between the time (t−1) and the time (t) accompanies the rotation motion and the translation motion, the region captured by the image capture unit 72 greatly changes by the rotation motion more than by the translation motion. Therefore, the region estimation unit 3 according to this embodiment emphasizes on the rotation motion of the moving object M more than the translation motion of the moving object M.

In detail, the region estimation unit 3 selects the camera that captures the region that is less changed by the rotation motion of the moving object M among the plurality of cameras configuring the image capture unit 72. That is to say, it selects the camera that can correspond more characteristic points in the image captured before and after the movement of the moving object M among a plurality of the cameras.

Specifically, the region estimation unit 3 calculates a rotation axis R of the rotation motion of the moving object M (self-rotation motion around the moving object M as the center) on the basis of the information generated by the detection unit 73. Then, the region estimation unit 3 calculates an angle among the rotation axis R and the optical axes $C_a$, $C_b$ of the respective cameras 72a, 72b.

In other words, the region estimation unit 3 calculates an angle $\theta_a$ between the rotation axis R and the optical axis $C_a$ of the first camera 72a and an angle $\theta_b$ between the rotation axis R and the optical axis $C_b$ of the second camera 72b. Note that when the angle $\theta a$ and the angle $\theta_b$ are calculated, the rotation axis R and the optical axes $C_a$, $C_b$ may be moved parallel, as appropriate.

As shown in FIG. 7, in the first camera 72a having the great angle $\theta_a$, the image $a_2$ captured at the time (t) is greatly moved from the image $a_1$ captured at the time (t−1). Thus, the characteristic point $P_1$ included in the image $a_1$ captured at the time (t−1) is greatly deviated from the image $a_2$ captured at the time (t).

As described above, there is high possibility that the characteristic point $P_{12}$ common to the image $a_1$ and the image $a_2$ captured by the first camera 72a having the great angle $\theta_a$ may not be present. In other words, there is high possibility that the characteristic point $P_{12}$ extracted from the image $a_1$ and the image $a_2$ by the tracking unit 2 may be acquired by mistracking, which is low reliability.

On the other hand, as shown in FIG. 7, in the second camera 72b having the small angle $\theta_b$, the image $b_2$ captured at the time (t) is less moved from the image $b_1$ captured at the time (t−1). Therefore, the characteristic point $P_1$ included in the image $b_1$ captured at the time (t−1) is also included in the image $b_2$ captured at the time (t).

Thus, there is high possibility that characteristic point $P_{12}$ common to the image $a_1$ and the image $a_2$ captured by the second camera 72b having the small angle $\theta_b$ may be present. In other words, there is high possibility that the characteristic point $P_{12}$ extracted from the image $b_1$ and the image $b_2$ by the tracking unit 2 may be acquired by right tracking, which is high reliability.

Accordingly, the region estimation unit 3 selects the camera having the optical axis where the angle between the rotation axis and the optical axis is smallest among the plurality of cameras configuring the image capture unit 72. That is to say, the region estimation unit 3 estimates that the region captured by the selected camera is where a two-dimensional position change of the characteristic points viewed from the moving object M is less changed before and after the movement of the moving object M.

In the examples shown in FIGS. 6, 7, as the angle $\theta_b$ by the second camera 72b is smaller than the angle $\theta_a$ by the first camera 72a, the region estimation unit 3 selects the second camera 72b.

The region estimation unit 3 generates output data that specifies the selected camera. Then, the region estimation unit 3 outputs the generated output data to the data generation unit 4.

Note that when the rotation axis of the moving object M is calculated by the region estimation unit 3, other information may be utilized in addition to the information generated by the detection unit 73, or in place of the information generated by the detection unit 73. Examples of other information, for example, include information acquired by a Karman filter. Specifically, the region estimation unit 3 may calculate the rotation axis of the moving object M from the posture of the moving object M at the time (t−1) and the time (t) predicted by the Kalman filter.

Also, the region estimation unit 3 may not necessarily calculate the rotation axis of the moving object M. In other words, the region estimation unit 3 may estimate the region where the two-dimensional position change of the characteristic points viewed from the moving object M is less changed before and after the movement of the moving object M not by using the rotation axis of the moving object M. For example, the region estimation unit 3 may calculate directly the region where the directions of the characteristic points viewed from the moving object M are expected to be less changed from a motion trajectory of the rotation motion and the translation motion of the moving object M.

(Data Generation Unit 4)

The data generation unit 4 acquires the output data of the tracking unit 2 and the output data of the region estimation unit 3. Then, the data generation unit 4 extracts the characteristic points included in the image captured by the camera selected by the region estimation unit 3 from the characteristic points corresponded by the tracking unit 2. There is high possibility that characteristic points are included common to the images captured by the camera selected by the region estimation unit 3, thereby extracting the characteristic point having higher reliability by the data generation unit 4.

Specifically, the data generation unit 4 extracts the characteristic points $P_{12}$ labeled by the second camera 72b selected by the region estimation unit 3 among the characteristic points $P_{12}$ corresponded by the tracking unit 2.

Furthermore, the data generation unit 4 extracts again the characteristic points where the tracking scores satisfy a predetermined threshold value from the above-described extracted characteristic points. The predetermined threshold value may be set arbitrarily. As described above, the higher the tracking scores of the characteristic points are, the higher the reliability is. The data generation unit 4 can narrow down the characteristic points having the higher reliability.

The data generation unit 4 adds information about a label for specifying the camera that captures the characteristic points, coordinates of the characteristic points in the images before and after the movement of the moving object M, the tracking scores of the characteristic points, etc. for the extracted characteristic points, and generates output data. Then, the tracking unit 2 outputs the generated output data to the estimation processing unit 5.

(Estimation Processing Unit 5)

The estimation processing unit 5 performs the self position estimation of the moving object M using the output data from the data generation unit 4. Specifically, the estimation processing unit 5 estimates the position and the posture of the moving object M at the time (t) from the position and the posture of the moving object M at the time (t−1) using the characteristic points extracted by the data generation unit 4.

For the self position estimation of the moving object M by the estimation processing unit 5, any method is usable. The estimation processing unit 5 can perform the self position estimation of the moving object M using an algorithm of the Karman filter from the characteristic points extracted from the data generation unit 4, for example.

As described above, the characteristic points extracted by the data generation unit 4 correspond with high reliability between the image captured at the time (t−1) and the image captured at the time (t). In this manner, the self position estimation unit 1 according to this embodiment allows the self position estimation of the moving object M by the estimation processing unit 5 with high precision using the characteristic points having high reliability.

Also, as described above, the estimation processing unit 5 does not use the characteristic points included in the image captured by the camera not selected by the region estimation unit 3 for the self position estimation of the moving object M. Specifically, the self position estimation unit 1 according to this embodiment does not use the characteristic points with low reliability, but use only the characteristic points with high reliability. It is possible to realize the effective self position estimation of the moving object M by the estimation processing unit 5.

[Information Processing Method by Self Position Estimation Unit 1]

Figure 8:
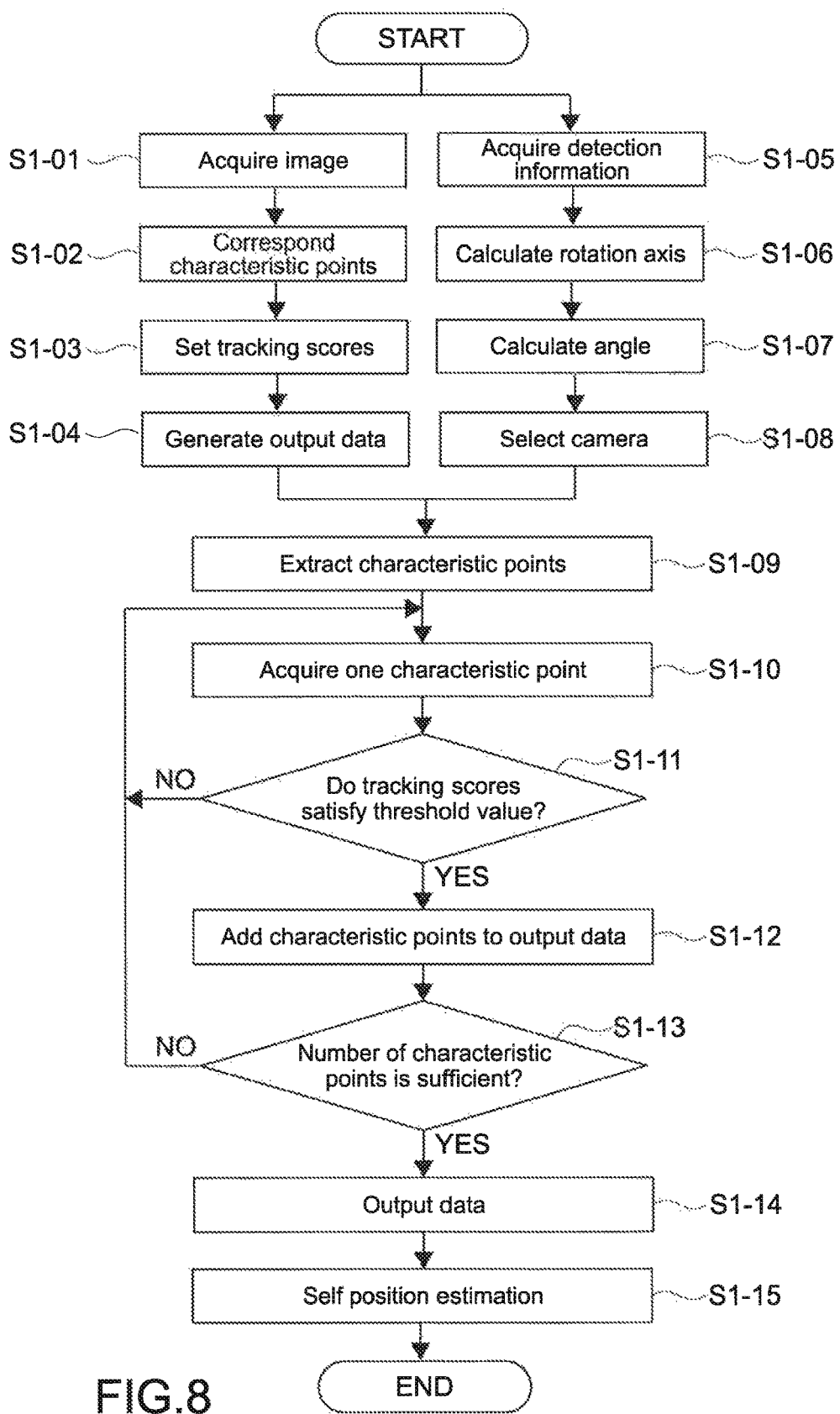
FIG. 8 is a flow chart showing a flow of processing by the self position estimation unit.

FIG. 8 is a flow chart showing a flow of processing by the self position estimation unit according to this embodiment. Along with FIG. 8, the information processing method by the self position estimation unit 1 will be described.

(Steps S1-01 to S1-04)

Steps S1-01 to S1-04 are executed by the tracking unit 2. The tracking unit 2 acquires the image captured by the image capture unit 72 (Step S1-01), corresponds the characteristic points included in the acquired image (Step S1-02), sets the tracking scores in the corresponded characteristic points (Step S1-03), generates the output data (Step S1-04), and outputs the generated data to the data generation unit 4.

(Steps S1-05 to S1-08)

Steps S1-05 to S1-08 are executed by the region estimation unit 3. The region estimation unit 3 acquires the information about the moving object M generated by the detection unit 73 (Step S1-05), calculates the rotation axis of the rotation motion of the moving object M from the acquired information (Step S1-06), calculates the angle between the calculated rotation axis and the optical axis of each camera (Step S1-07), selects the camera on the basis of the calculated angle (Step S1-08), and outputs the data that specifies the selected camera to the data generation unit 4.

(Steps S1-09 to S1-14)

Steps S1-09 to S1-14 are executed by the data generation unit 4. The data generation unit 4 extracts the characteristic points included in the image captured by the camera input from the region estimation unit 3 from the characteristic points input from the tracking unit 2 (Step S1-09). The data generation unit 4 acquires one extracted characteristic point (Step S1-10), and determines whether or not the tracking scores of the characteristic points satisfy the threshold value (Step S1-11).

When the tracking scores of the characteristic points acquired by the data generation unit 4 do not satisfy the threshold value, it returns to Step S1-10. When the tracking scores of the characteristic points acquired by the data generation unit 4 satisfy the threshold value, the characteristic point is added to the output data (Step S1-12), and it determines whether or not the number of the characteristic points in the output data is sufficient (Step S1-13). When the number of the characteristic points is insufficient, it returns to Step S1-10. When the number of the characteristic points in the output data is sufficient, the generated data is output to the estimation processing unit 5.

(Step S1-15)

Step S1-15 is executed by the estimation processing unit 5. The estimation processing unit 5 performs the self position estimation of the moving object M using the output data of the data generation unit 4.

Alternative Embodiment

Figure 9:
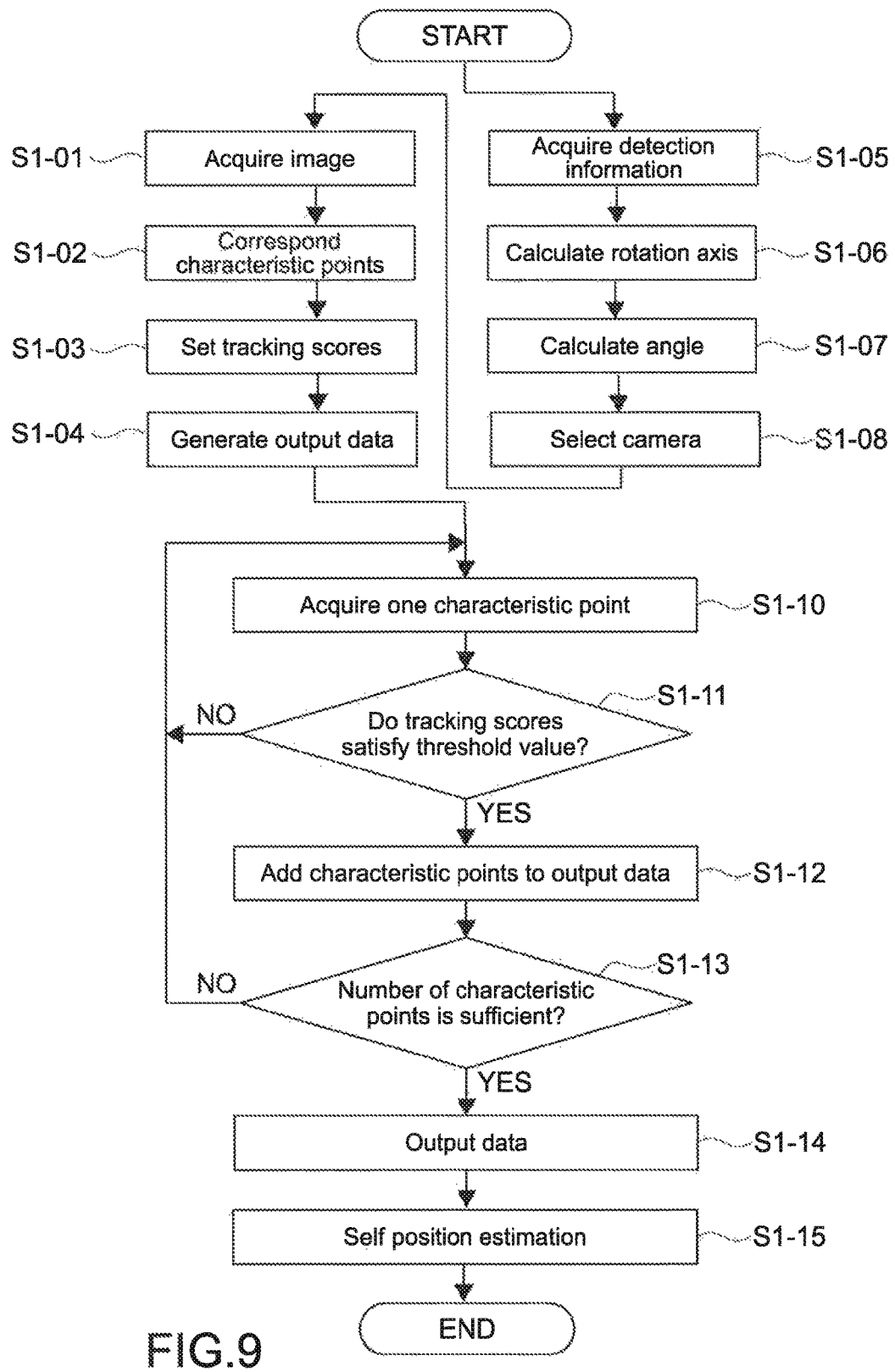
FIG. 9 is a flow chart showing a flow of processing by the self position estimation unit according to an alternative embodiment.

FIG. 9 is a flow chart showing a flow of processing by the self position estimation unit 1 according to an alternative embodiment of the embodiment. The information processing method according to the alternative embodiment is different from the information processing method shown in FIG. 8 in that Steps S1-05 to S1-08 by the region estimation unit 3 are executed before Steps S1-01 to S1-04 by the tracking unit 2. Along with FIG. 9, the information processing method according to the alternative embodiment will be described.

First, in Steps S1-05 to S1-08, the region estimation unit 3 selects the camera, and outputs the data that specifies the selected camera to the tracking unit 2. The tracking unit 2 acquires the image captured by the camera selected by the region estimation unit 3 (Step S1-01), corresponds the characteristic points included in the acquired image (Step S1-02), sets the tracking scores to the corresponded characteristic points (Step S1-03), generates the output data (Step S1-04), and outputs the generated data to the data generation unit 4.

As the data input from the tracking unit 2 to the data generation unit 4 only includes characteristic points included in the image captured by the camera selected by the region estimation unit 3, there is no need to execute the extraction of the characteristic points in FIG. 8 (Step S1-09) in the information processing method according to the alternative embodiment.

Steps S1-10 to S1-15 in FIG. 9 are similar to Steps S1-10 to S1-15 in FIG. 8.

In the information processing method according to the alternative embodiment, the tracking unit 2 tracks not using the image captured by the camera not selected by the region estimation unit 3, but using only the image captured by the camera selected by the region estimation unit 3, whereby the effective tracking is possible.

Second Embodiment

Figure 10:
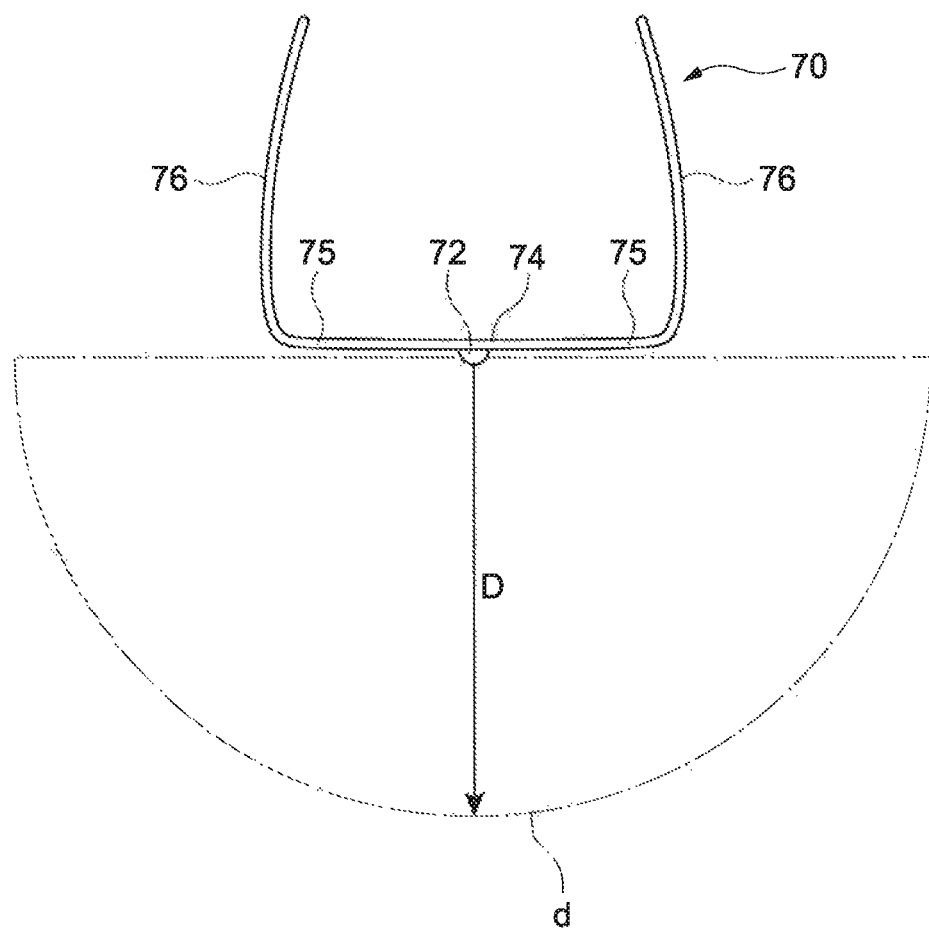
FIG. 10 is a view showing a head mount display in an information processing system according to a second embodiment of the present technology.

FIG. 10 is a view showing the head mount display 70 in the information processing system 100 according to a second embodiment of the present technology. In the information processing system 100 according to this embodiment, the configuration of the image capture unit 72, and the information processing method by the self position estimation unit 1 are different from the information processing system 100 according to the first embodiment. Hereinafter, the configurations of the information processing system 100 according to this embodiment corresponding to the information processing system 100 in first embodiment are denoted by the same reference numerals, and thus detailed description thereof will be hereinafter omitted.

The information processing system 100 according to this embodiment, the image capture unit 72 is configured as a camera having a 180° viewing angle, and its front is disposed toward a bridge unit 74 of the head mount display 70. Also, the image capture unit 72 has an optical axis D, and can capture an image d being the optical axis D as a center.

The image capture unit 72 is preferably a wide viewing angle camera. Particularly preferably, the viewing angle of the image capture unit 72 is 90° or more. Note that the camera configuring the image capture unit 72 is not limited to a specific type, and may be, for example, any of a wide angle camera, a fish-eye camera, a panorama camera, etc.

Figure 11:
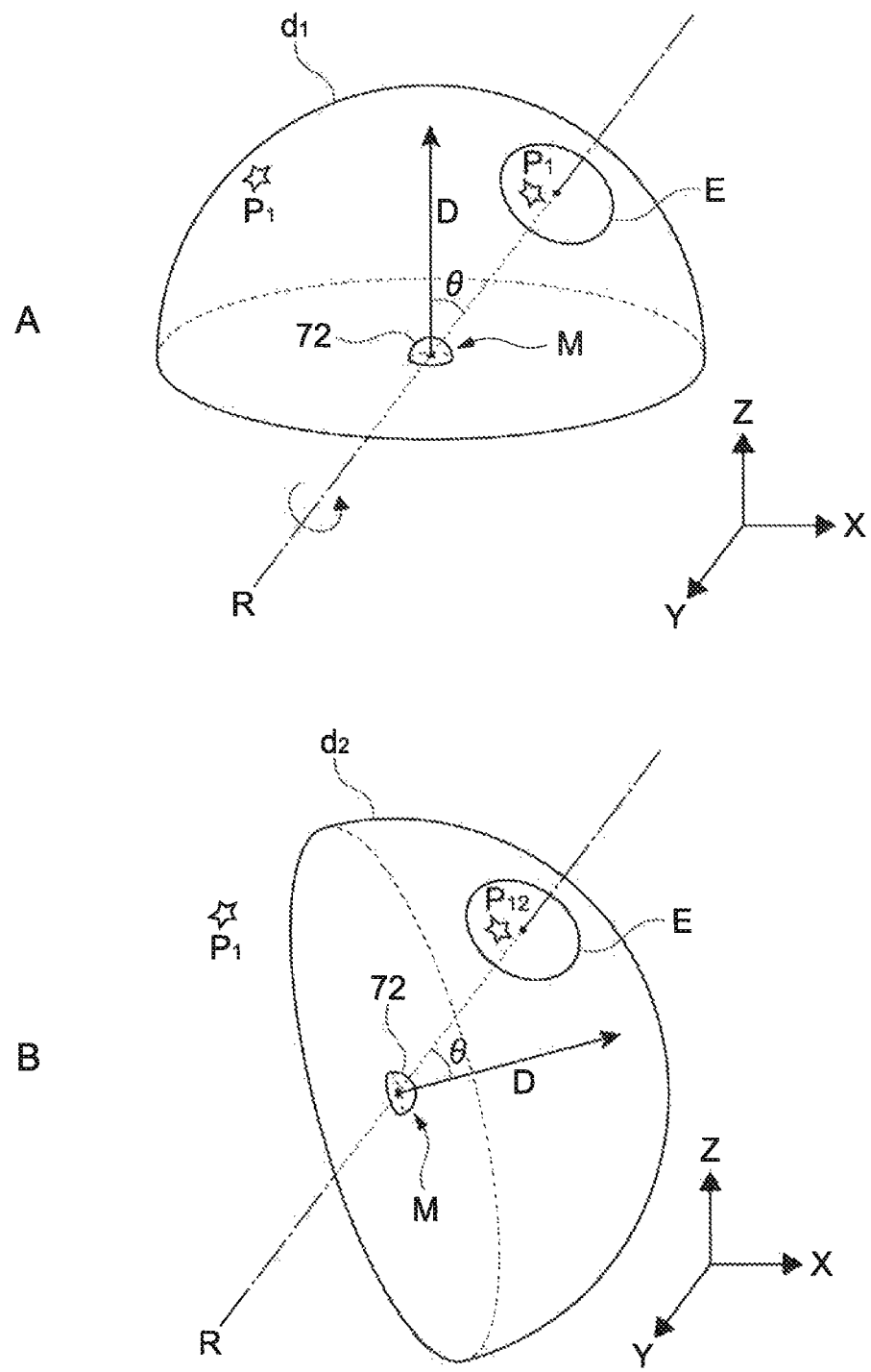
FIG. 11 are diagrams for explaining operations of a tracking unit and a region estimation unit of the information processing system.

FIG. 11 are diagrams for explaining operations of the tracking unit 2 and the region estimation unit 3 of the information processing system 100 according to this embodiment. In FIG. 11, the moving object M is simplified, and only the image capture unit 72 is shown.

FIG. 11(A) shows the state at the time (t−1), FIG. 11(B) shows the state at the time (t) just after that. The moving object M moves accompanying the rotation motion between the time (t−1) and the time (t). Accordingly, the direction of the moving object M is changed, and the direction of the optical axis D of the image capture unit 72 is changed at the time (t−1) shown in FIG. 11(A) and at the time (t) shown in FIG. 11(B).

The image capture unit 72 captures image $d_1$ at the time (t−1) shown in FIG. 13(A), and captures image $d_2$ at the time (t) shown in FIG. 11(B).

The tracking unit 2 acquires the image $d_1$ and the image $d_2$ captured by the image capture unit 72, detects the characteristic point $P_1$ from the image $d_1$, and detects the characteristic point $P_2$ from the image $d_2$. Then, the tracking unit 2 corresponds the characteristic points $P_{12}$ common to the image $d_1$ and the image $d_2$.

As described above, the tracking unit 2 according to this embodiment uses for tracking the image captured by the image capture unit 72 having a wide viewing angle. As the image capture unit 72 having a wide viewing angle can capture the characteristic points in a wider range, it can prevent the tracking of the characteristic points by the tracking unit 2 from being impossible.

The region estimation unit 3 calculates the rotation axis R of the rotation motion of the moving object M (self-rotation motion around the moving object M as the center) on the bases of the information about the movement of the moving object M generated by the detection unit 73. Then, the region estimation unit 3 selects the region through which the rotation axis R passes. In other words, the region estimation unit 3 estimates the region where the two-dimensional positions of the characteristic points viewed from the moving object M are less changed before and after the movement of the moving object M.

The data generation unit 4 cuts out the region estimated by the region estimation unit 3 from the image $d_1$ captured at the time (t−1) and the image $d_2$ captured at the time (t), and generates a trimming image E as the image that is processed by the data generation unit 4. That is to say, the region estimation unit 3 limits a processing region of the image $d_1$ and the image $d_2$ by the data generation unit 4 to the region estimated by the estimation unit 3.

A size of the trimming image E (size of the region estimated by the region estimation unit 3) can be determined, as appropriate. For example, the region estimation unit 3 can enlarge the trimming image E, when it is expected that the two-dimensional positions of the characteristic points viewed from the moving object M are relatively greatly changed before and after the movement of the moving object M.

As an example, when an angular velocity of the rotation motion of the moving object M is great, the two-dimensional positions of the characteristic points viewed from the moving object M tend to be greatly changed. Accordingly, the region estimation unit 3 enlarges the trimming image E, when the angular velocity of the rotation motion of the moving object M is great. This allows a sufficient number of the characteristic points included in the trimming image E to be ensured.

Oppositely, when the angular velocity of the rotation motion of the moving object M is small, the region estimation unit 3 reduces the trimming image E. This allows treatment in the data generation unit 4 and the estimation processing unit 5 to be efficient.

In addition, when the movement of the moving object M accompanies also the translation motion in addition to the rotation motion, the two-dimensional positions of the characteristic points viewed from the moving object M tend to be deviated. Accordingly, the region estimation unit 3 enlarges the trimming image E, when the movement of the moving object M accompanies the translation motion. This allows a sufficient number of the characteristic points included in the trimming image E to be ensured.

Furthermore, a shape of the trimming image E (shape of the region estimated by the region estimation unit 3) can be determined arbitrarily. Examples of the shape of the trimming image E include a polygon such as a rectangle, an oval, and the like, other than a circle shown in FIG. 11.

Figure 12:
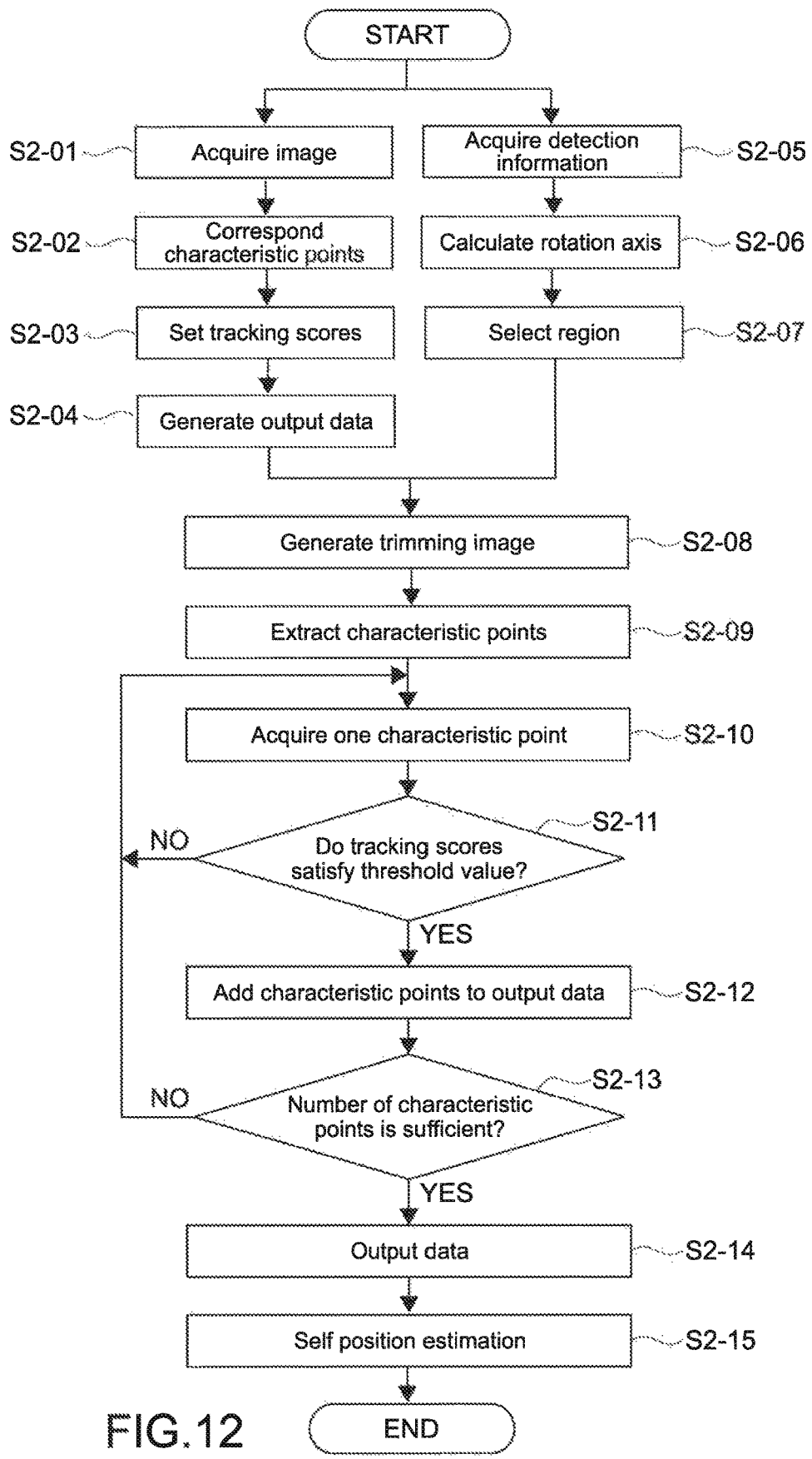
FIG. 12 is a flow chart showing a flow of processing by the self position estimation unit.

FIG. 12 is a flow chart showing a flow of processing by the self position estimation unit 1 according to this embodiment. Along with FIG. 12, the information processing method by the self position estimation unit 1 will be described.

(Steps S2-01 to S2-04)

Steps S2-01 to S2-04 are executed by the tracking unit 2. The tracking unit 2 acquires the image captured by the image capture unit 72 (Step S2-01), corresponds the characteristic point included in the acquired image (Step S2-02), sets the tracking scores to the corresponded characteristic points (Step S2-03), generates the output data (Step S2-04), and outputs the generated data to the data generation unit 4.

(Steps S2-05 to S2-08)

Steps S2-05 to S2-08 are executed by the region estimation unit 3. The region estimation unit 3 acquires the information about the movement of the moving object M generated by the detection unit 73 (Step S2-05), calculates the rotation axis of the rotation motion of the moving object M from the acquired information (Step S2-06), selects the region passing through the calculated rotation axis (Step S2-07), and outputs the data specifying the selected region to the data generation unit 4.

(Steps S2-08 to S2-15)

Steps S2-08 to S2-14 are executed by the data generation unit 4, and Step S2-15 is executed by the estimation processing unit 5. The data generation unit 4 cuts out the image captured by the image capture unit 72 from the region estimated by the region estimation unit 3, and generates the trimming image E (S2-08). The data generation unit 4 extracts the characteristic points included in the trimming image from the characteristic points corresponded by the tracking unit 2 (Step S2-09).

Steps S2-10 to S2-15 are similar to Steps S1-10 to S1-15 in FIG. 8.

Alternative Embodiment

Figure 13:
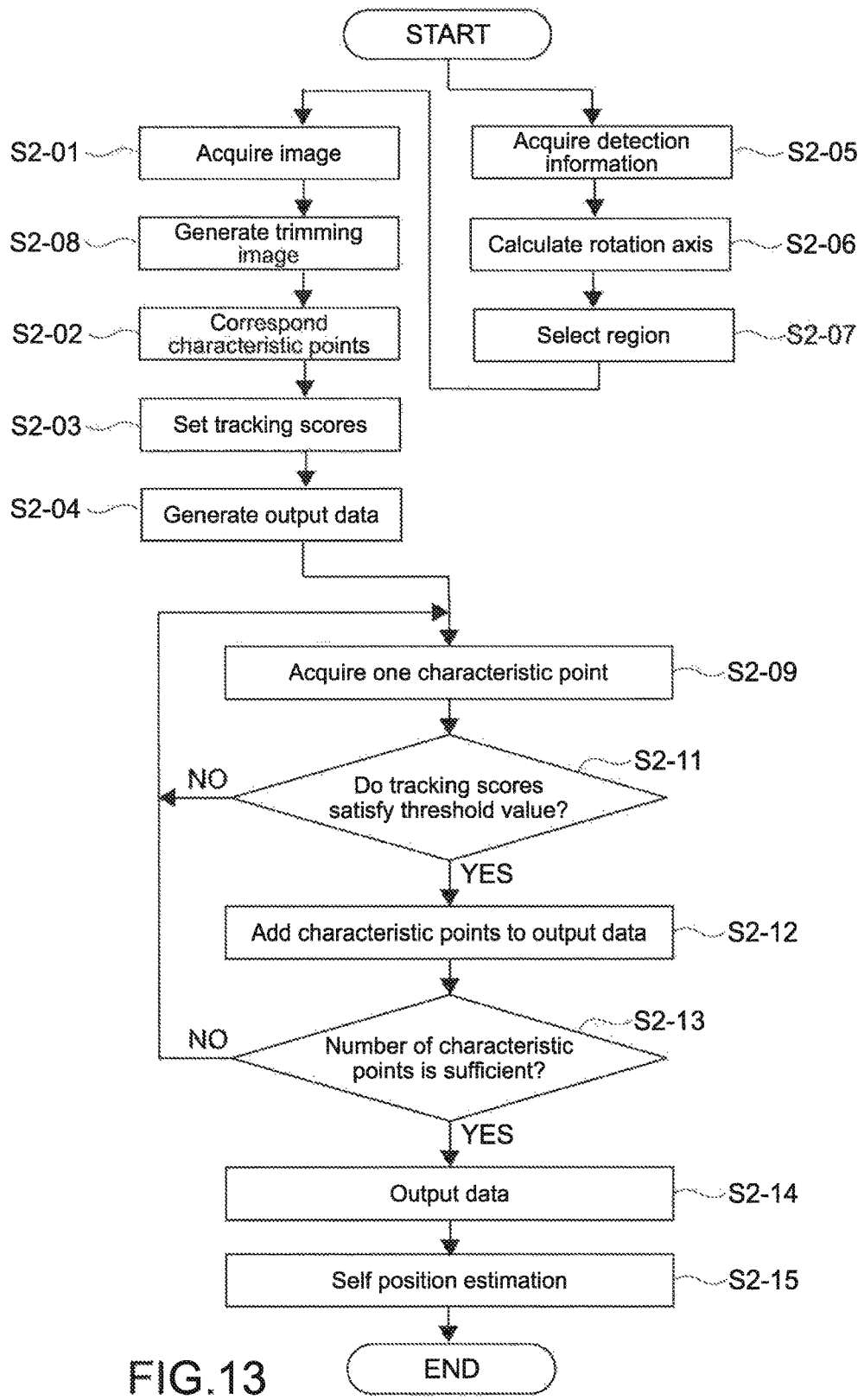
FIG. 13 is a flow chart showing a flow of processing by the self position estimation unit according to an alternative embodiment.

FIG. 13 is a flow chart showing a flow of processing by the self position estimation unit 1 according to an alternative embodiment of the embodiment. The information processing method according to the alternative embodiment is different from the information processing method shown in FIG. 12 in that Steps S2-05 to S2-07 are executed by the region estimation unit 3 before Steps S2-01 to S2-04 are executed by the tracking unit 2. Along with FIG. 13, the information processing method according to the alternative embodiment will be described.

First, in Steps S2-05 to S2-07, the data specifying the region selected by the region estimation unit 3 is output to the tracking unit 2. The tracking unit 2 acquires the image captured by the image capture unit 72 (Step S2-01), cuts out the region estimated by the region estimation unit 3 from the acquired image, and generates the trimming image (Step S2-08). In the alternative embodiment, the tracking unit 2 functions as the data generation unit for generating the trimming image.

The tracking unit 2 corresponds the characteristic points included in the trimming image (Step S2-02), sets the tracking scores to the corresponded characteristic points (Step S2-03), generates the output data (Step S2-04), and outputs the generated data to the data generation unit 4.

As the data input from the tracking unit 2 to the data generation unit 4 only includes the characteristic points included in the region selected by the region estimation unit 3, there is no need to execute the extraction of the characteristic points in FIG. 12 (Step S2-09) in the information processing method according to the alternative embodiment.

Steps S2-09 to S2-15 in FIG. 13 are similar to Steps S2-09 to S2-15 in FIG. 12.

In the information processing method according to the alternative embodiment, the tracking unit 2 tracks using only the trimming image and without using the regions other than the trimming image from the image captured by the image capture unit 72, whereby the effective tracking is possible.

Third Embodiment

Figure 14:
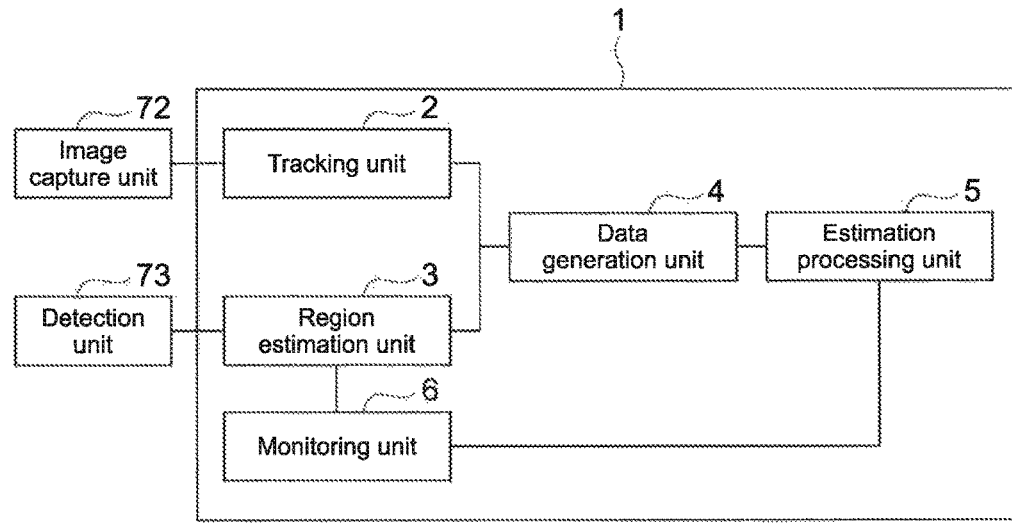
FIG. 14 is a block diagram showing a configuration of a self position estimation unit of an information processing system according to a third embodiment of the present technology.

FIG. 14 is a block diagram showing a configuration of the self position estimation unit 1 of the information processing system 100 according to a third embodiment of the present technology. In the information processing system 100 according to this embodiment, the configuration of the self position estimation unit 1, and the information processing method by the self position estimation unit 1 are different from the information processing system 100 according to the first embodiment. Hereinafter, the configurations of the information processing system 100 according to this embodiment corresponding to the information processing system 100 in first embodiment are denoted by the same reference numerals, and thus detailed description thereof will be hereinafter omitted.

The self position estimation unit 1 according to this embodiment includes a monitoring unit 6. In the self position estimation unit 1 according to this embodiment, the estimation processing unit 5 performs the second self position estimation of the moving object M by the output data from the monitoring unit 6 independent from the first self position estimation of the moving object M by the output data from the data generation unit 4 similar to the first embodiment. In other words, the estimation processing unit 5 performs the self position estimation of the moving object M in two ways.

The monitoring unit 6 monitors time series changes of the position and the posture of the moving object M by temporally continuously referring the information generated by the detection unit 73. The monitoring unit 6 generates the output data by the result of the monitoring of the moving object M, and outputs the generated data to the estimation processing unit 5. The estimation processing unit 5 estimates the position and the posture of the moving object M at the time (t) on the basis of the result of the monitoring of the moving object M by the monitoring unit 6.

As the output data of the monitoring unit 6 is acquired by temporally continuously referring the information generated by the detection unit 73, it is difficult to be influenced by temporally discontinuous data by misdetection of the detection unit 73. Accordingly, in the self position estimation unit 1 according to this embodiment, highly precise self position estimation of the moving object M is possible by complementarily utilizing the second self position estimation of the moving object M by the monitoring unit 6 and the first self position estimation of the moving object M by the output data from the data generation unit 4.

Also, in the self position estimation unit 1 according to this embodiment, the output data generation by the monitoring unit 6 and the second self position estimation by the estimation processing unit 5 using the output data from the monitoring unit 6 can be effectively performed by introducing a motion model where the movement of the moving object M is modeled. The motion model is that the operation easily done by the moving object M is modeled. The motion model corresponding to the moving object M is set in advance.

Specifically, the monitoring unit 6 estimates the motion model of the operation of the moving object M from the motion models set in advance by determining that the moving object M is in a uniform motion, a retarded motion or an accelerated motion or whether or not the speed is changed, or by calculating a rate of speed change, generates the output data from the estimation result, and outputs the generated data to the estimation processing unit 5. The estimation processing unit 5 estimates the position and the posture of the moving object M at the time (t) on the basis of the motion model estimated by the monitoring unit 6.

For example, when the moving object M is the user wearing the head mount display 70, the motion model that models the motion easily done by a human is set. Examples of the motion model includes a static motion model, a walking motion model, and a running motion model. Note that types and numbers of the set motion models may be arbitrarily determined.

Figure 15:
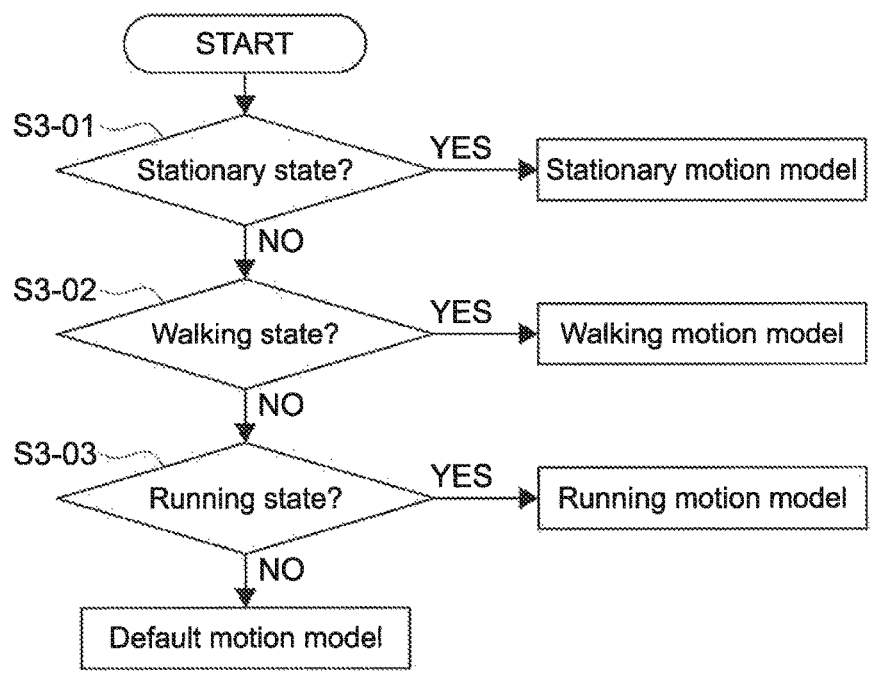
FIG. 15 is a flow chart showing processing by a monitoring unit of the self position estimation unit.

FIG. 15 is a flow chart showing an example of processing by the monitoring unit 6. First, the monitoring unit 6 determines whether or not the moving object M is in a stationary state (Step S3-01). For example, when the motion of the moving object M is not detected, it is determined that the moving object M in in the stationary state. When the moving object M is in the stationary state, the monitoring unit 6 determines the motion model of the moving object M as the stationary motion model.

When the moving object M is not in the stationary state, the monitoring unit 6 determines whether or not the moving object M in the walking state (Step S3-02). For example, when the uniform motion within a predetermined first range (for example, a range from 3 to 6 km per hour) of the moving object M is detected, it is determined that the moving object M is in the walking state. When the moving object M is in the walking state, the monitoring unit 6 determines the motion model of the moving object M as the walking motion model.

When the moving object M is not in the walking state, the monitoring unit 6 determines whether or not the moving object M is in the running state (Step S3-03). For example, when the uniform motion within a predetermined second range (for example, a range from 7 to 10 km per hour) of the moving object M is detected, it is determined that the moving object M is in the running state. When the moving object M is in the running state, the monitoring unit 6 determines the motion model of the moving object M as the running motion model.

When moving object M is also not in the running state, the monitoring unit 6 determines the motion model of the moving object M as a default motion model.

Once the monitoring unit 6 determines the motion model of the moving object M as the stationary motion model, the monitoring unit 6 generates the output data for specifying the stationary motion model, and outputs the generated data to the estimation processing unit 5. The estimation processing unit 5 estimates that the position of the moving object M at the time (t) is not changed from the position of the moving object M at the time (t−1) on the basis of the output data of the monitoring unit 6.

Once the monitoring unit 6 determines the motion model of the moving object M as the walking motion model, the monitoring unit 6 generates the output data for specifying the walking motion model, and outputs the generated data to the estimation processing unit 5. The estimation processing unit 5 estimates the position of the moving object M at the time (t) from the position of the moving object M at the time (t−1) on the basis of the output data of the monitoring unit 6.

Once the monitoring unit 6 determines the motion model of the moving object M as the running motion model, the monitoring unit 6 generates the output data for specifying the running motion model, and outputs the generated data to the estimation processing unit 5. The estimation processing unit 5 estimates the position of the moving object M at the time (t) from the position of the moving object M at the time (t−1) on the basis of the output data of the monitoring unit 6.

Once the monitoring unit 6 determines the motion model of the moving object M as the default motion model, the monitoring unit 6 generates the output data without specifying the motion model. In other words, the monitoring unit 6 outputs the monitoring result of the time series changes of the position and the posture of the moving object M as it is to the estimation processing unit 5. The estimation processing unit 5 estimates the position and the posture of the moving object M at the time (t) on the basis of the time series changes of the position and the posture of the moving object M monitored by the monitoring unit 6.

In the self position estimation unit 1 according to this embodiment, the detection unit 73 may be configured to be capable of detecting control contents by a control system about the movement of the moving object M that is controlled by an electrical, mechanical or optical control system. In this case, the monitoring unit 6 can monitor the time series changes of the position and the posture of the moving object M by temporally continuously referring the control contents of the control system.

As an example, when moving object M is a boarding type apparatus in which movement is controlled by a steering device or an accelerator pedal such as a passenger car, for example, the detection unit 73 is configured to be capable of detecting a manipulated amount of the steering device or the accelerator pedal. The monitoring unit 6 monitors the time series changes of the position and the posture of the moving object M by temporally continuously referring the manipulated amount of the steering device or the accelerator pedal detected by the detection unit 73.

When the moving object M is a robot having an autonomous behavior function, the detection unit 73 is configured to be capable of detecting a control signal. The monitoring unit 6 monitors the time series changes of the position and the posture of the moving object M by temporally continuously referring the control signal detected by the detection unit 73.

Other Embodiments

While the embodiments of the present technology is described, it should be understood that the present technology is not limited the above-described embodiments, and variations and modifications may be made without departing from the scope of the present technology.

For example, in the embodiments, although the moving object M is described mainly as the user wearing the head mount display, the present technology is applicable to any moving object M. Examples of the moving object M to which the present technology is applicable include a human, a vehicle, a robot, an animal, etc. In any case, it is possible to perform the self position estimation of the moving object M according to the present technology by disposing the image capture unit and the detection unit on the moving object M.

The present technology may also have the following configurations.

(1) An information processing apparatus, including:
 a tracking unit that acquires an image captured by an image capture unit disposed at a moving object, and corresponds characteristic points included in the image captured before movement and the image captured after the movement, the moving object moving accompanying a rotation motion;
 a region estimation unit that acquires information about the movement, and estimates regions where two-dimensional positions of the characteristic points are less changed viewed from the moving object before and after the movement of the moving object on the basis of the information; and
 an estimation processing unit that performs self position estimation of the moving object using the characteristic points within the regions corresponded by the tracking unit.

(2) The information processing apparatus according to (1), in which
 the region estimation unit calculates a rotation axis of the rotation motion, and estimates the regions using the rotation axis.

(3) The information processing apparatus according to (1), in which
 the image capture unit includes a plurality of camera mechanisms having optical axes that are mutually not in parallel,
 the region estimation unit selects the camera mechanism having the optical axis where the angle between the rotation axis and the optical axis is smallest among the plurality of camera mechanisms, and
 the estimation processing unit performs the self position estimation of the moving object using the characteristic points included in the image captured by the camera mechanism selected by the region estimation unit.

(4) The information processing apparatus according to (3), further including:
 a data generation unit that extracts the characteristic points included in the image captured by the camera mechanism selected by the region estimation unit from the characteristic points corresponded by the tracking unit, in which
 the estimation processing unit performs the self position estimation of the moving object using the characteristic points extracted by the data generation unit.

(5) The information processing apparatus according to (3), in which
 the tracking unit corresponds the characteristic points included in the image captured by the camera mechanism selected by the region estimation unit.

(6) The information processing apparatus according to (2), in which
 the region estimation unit estimates the regions such that the rotation axis passes through the regions.

(7) The information processing apparatus according to (6), in which
 the image capture unit has a viewing angle of 90° or more.

(8) The information processing apparatus according to (6) or (7), further including:
 a data generation unit that limits a processing region of the image within the regions, in which
 the estimation processing unit performs the self position estimation of the moving object using the characteristic points included in the processing region.

(9) The information processing apparatus according to (8), in which
 the data generation unit extracts the characteristic points included in the processing region from the characteristic points corresponded by the tracking unit, and
 the estimation processing unit performs the self position estimation of the moving object using the characteristic points extracted by the data generation unit.

(10) The information processing apparatus according to (8), in which
 the tracking unit corresponds the characteristic points included in the processing region.

(11) The information processing apparatus according to any one of (8) to (10), in which
 the region estimation unit enlarges the processing region, when the angular velocity of the rotation motion is great.

(12) The information processing apparatus according to any one of (8) to (11), in which
 the region estimation unit enlarges the processing region, when the movement accompanies a translation motion.

(13) The information processing apparatus according to any of (1) to (12), in which
 the tracking unit sets tracking scores that show a degree of coincidence for the characteristic points in the image captured before the movement and the image captured after the movement for the every corresponded characteristic points, and
 the estimation processing unit performs the self position estimation of the moving object using the characteristic points having the high tracking scores.

(14) The information processing apparatus according to (13), in which
 the tracking unit sets high the tracking scores of the characteristic points within a central region of at least one of the image captured before the movement and the image captured after the movement.

(15) The information processing apparatus according to any one of (1) to (15), in which
the information is generated using at least one of a gyro sensor, a geomagnetic sensor, an acceleration sensor, a sound source direction estimation device and Wi-Fi.
(16) The information processing apparatus according to any one of (1) to (15), further including:
a monitoring unit that monitors the moving object by the information, in which
the estimation processing unit performs self position estimation of the moving object independent of the self position estimation on the basis of the result of the monitoring by the monitoring unit.
(17) The information processing apparatus according to (16), in which
the monitoring unit estimates a motion model of the moving object, and
the estimation processing unit performs the self position estimation of the moving object using the motion model estimated by the monitoring unit.
(18) The information processing apparatus according to any one of (1) to (17), further including:
a head mount display having the image capture unit and a detection unit being capable of generating the information, the head mount display being configured to be mountable to a head of a user as the moving object.
(19) An information processing method, including:
capturing an image by an image capture unit disposed at a moving object that moves accompanying a rotation motion;
corresponding characteristic points included in the image captured before movement and the image captured after the movement;
generating information about the movement;
estimating regions where two-dimensional positions of the characteristic points are less changed viewed from the moving object before and after the movement of the moving object on the basis of the information; and
performing self position estimation of the moving object using the corresponded characteristic points within the regions.
(20) A program to be executed by an information processing apparatus, including the steps of:
acquiring an image captured by an image capture unit disposed at a moving object, and corresponding characteristic points included in the image captured before movement and the image captured after the movement, the moving object moving accompanying a rotation motion;
acquiring information about the movement, and estimating regions where two-dimensional positions of the characteristic points are less changed viewed from the moving object before and after the movement of the moving object on the basis of the information; and
performing self position estimation of the moving object using the corresponded characteristic points within the regions.

REFERENCE SIGNS LIST 1 self position estimation unit
2 tracking unit
3 region estimation unit
4 data generation unit
5 estimation processing unit
10 cloud system
30 portable terminal
50 control box
70 head mount display
72 image capture unit
72a, 72b camera
73 detection unit
M moving object

The invention claimed is:
1. An information processing apparatus, comprising:
a tracking unit that acquires an image captured by an image capture unit disposed at a moving object, and corresponds characteristic points included in the image captured before movement and the image captured after the movement, the moving object moving accompanying a rotation motion;
a region estimation unit that acquires information about the movement, and estimates regions where two-dimensional positions of the characteristic points are less changed viewed from the moving object before and after the movement of the moving object on the basis of the information; and
an estimation processing unit that performs self position estimation of the moving object using the characteristic points within the regions corresponded by the tracking unit,
wherein the tracking unit, the image capture unit, the region estimation unit, and the estimation processing unit are each implemented via at least one processor.
2. The information processing apparatus according to claim 1, wherein
the region estimation unit calculates a rotation axis of the rotation motion, and estimates the regions using the rotation axis.
3. The information processing apparatus according to claim 2, wherein
the image capture unit includes a plurality of camera mechanisms having optical axes that are mutually not in parallel,
the region estimation unit selects the camera mechanism having the optical axis where the angle between the rotation axis and the optical axis is smallest among the plurality of camera mechanisms, and
the estimation processing unit performs the self position estimation of the moving object using the characteristic points included in the image captured by the camera mechanism selected by the region estimation unit.
4. The information processing apparatus according to claim 3, further comprising:
a data generation unit that extracts the characteristic points included in the image captured by the camera mechanism selected by the region estimation unit from the characteristic points corresponded by the tracking unit, wherein
the estimation processing unit performs the self position estimation of the moving object using the characteristic points extracted by the data generation unit,
wherein the data generation unit is implemented via at least one processor.
5. The information processing apparatus according to claim 3, wherein
the tracking unit corresponds the characteristic points included in the image captured by the camera mechanism selected by the region estimation unit.
6. The information processing apparatus according to claim 2, wherein
the region estimation unit estimates the regions such that the rotation axis passes through the regions.

7. The information processing apparatus according to claim 6, wherein
the image capture unit has a viewing angle of 90° or more.

8. The information processing apparatus according to claim 6, further comprising:
a data generation unit that limits a processing region of the image within the regions, wherein
the estimation processing unit performs the self position estimation of the moving object using the characteristic points included in the processing region,
wherein the data generation unit is implemented via at least one processor.

9. The information processing apparatus according to claim 8, wherein
the data generation unit extracts the characteristic points included in the processing region from the characteristic points corresponded by the tracking unit, and
the estimation processing unit performs the self position estimation of the moving object using the characteristic points extracted by the data generation unit.

10. The information processing apparatus according to claim 8, wherein
the tracking unit corresponds the characteristic points included in the processing region.

11. The information processing apparatus according to claim 8, wherein
the region estimation unit enlarges the processing region, when the angular velocity of the rotation motion is great.

12. The information processing apparatus according to claim 8, wherein
the region estimation unit enlarges the processing region, when the movement accompanies a translation motion.

13. The information processing apparatus according to claim 1, wherein
the tracking unit sets tracking scores that show a degree of coincidence for the characteristic points in the image captured before the movement and the image captured after the movement for the every corresponded characteristic points, and
the estimation processing unit performs the self position estimation of the moving object using the characteristic points having the high tracking scores.

14. The information processing apparatus according to claim 13, wherein
the tracking unit sets high the tracking scores of the characteristic points within a central region of at least one of the image captured before the movement and the image captured after the movement.

15. The information processing apparatus according to claim 1, wherein
the information is generated using at least one of a gyro sensor, a geomagnetic sensor, an acceleration sensor, a sound source direction estimation device and Wi-Fi.

16. The information processing apparatus according to claim 1, further comprising:
a monitoring unit that monitors the moving object by the information, wherein
the estimation processing unit performs self position estimation of the moving object independent of the self position estimation on the basis of the result of the monitoring by the monitoring unit,
wherein the monitoring unit is implemented via at least one processor.

17. The information processing apparatus according to claim 16, wherein
the monitoring unit estimates a motion model of the moving object, and
the estimation processing unit performs the self position estimation of the moving object using the motion model estimated by the monitoring unit.

18. The information processing apparatus according to claim 1, further comprising:
a head mount display having the image capture unit and a detection unit being capable of generating the information, the head mount display being configured to be mountable to a head of a user as the moving object,
wherein the detection unit is implemented via at least one processor.

19. An information processing method, comprising:
capturing an image by an image capture unit, wherein the image capture unit is implemented via at least one processor and disposed at a moving object that moves accompanying a rotation motion;
corresponding characteristic points included in the image captured before movement and the image captured after the movement;
generating information about the movement;
estimating regions where two-dimensional positions of the characteristic points are less changed viewed from the moving object before and after the movement of the moving object on the basis of the information; and
performing self position estimation of the moving object using the corresponded characteristic points within the regions.

20. A non-transitory computer-readable medium having embodied thereon a program, which when executed by one or more processors of an information processing apparatus causes the information processing apparatus to execute a method, the method comprising:
acquiring an image captured by an image capture unit, wherein the image capture unit is implemented via at least one processor and disposed at a moving object, and corresponding characteristic points included in the image captured before movement and the image captured after the movement, the moving object moving accompanying a rotation motion;
acquiring information about the movement, and estimating regions where two-dimensional positions of the characteristic points are less changed viewed from the moving object before and after the movement of the moving object on the basis of the information; and
performing self position estimation of the moving object using the corresponded characteristic points within the regions.

* * * * *